US011545174B2

(12) United States Patent
Bone et al.

(10) Patent No.: US 11,545,174 B2
(45) Date of Patent: Jan. 3, 2023

(54) EMOTION DETECTION USING SPEAKER BASELINE

(71) Applicant: Amazon Technologies, Inc., Seattle, WA (US)

(72) Inventors: Daniel Kenneth Bone, Boston, MA (US); Chao Wang, Newton, MA (US); Viktor Rozgic, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 23 days.

(21) Appl. No.: 17/178,844

(22) Filed: Feb. 18, 2021

(65) Prior Publication Data

US 2021/0249035 A1    Aug. 12, 2021

Related U.S. Application Data

(63) Continuation of application No. 16/456,158, filed on Jun. 28, 2019, now Pat. No. 10,943,604.

(51) Int. Cl.
*G10L 25/63* (2013.01)
*G10L 17/04* (2013.01)

(52) U.S. Cl.
CPC .............. *G10L 25/63* (2013.01); *G10L 17/04* (2013.01)

(58) Field of Classification Search
CPC ......... G10L 25/63; G10L 17/04; G10L 25/30; G10L 15/1822; G10L 15/22; G10L 15/26; G10L 25/51; G10L 2015/223
See application file for complete search history.

(56) References Cited

U.S. PATENT DOCUMENTS

2004/0013252 A1* 1/2004 Craner ................ H04M 1/247
                                                                379/142.01
2018/0101776 A1* 4/2018 Osotio ................ G06F 16/258

OTHER PUBLICATIONS

International Preliminary Report of Patentability dated Dec. 28, 2021 for International Patent Application No. PCT/US2020/036605.
Yang, et al.: "Context-rich Detection of User's Emotions Using a Smartphone", XP055357022, Sep. 1, 2011, Retrieved from the Internet: URL: http://www.ece.rochester.edu/~nayang/papers/Yang_MSRReport.pdf.

* cited by examiner

*Primary Examiner* — Yogeshkumar Patel
(74) *Attorney, Agent, or Firm* — Pierce Atwood LLP

(57) ABSTRACT

Described herein is a system for emotion detection in audio data using a speaker's baseline. The baseline may represent a user's speaking style in a neutral emotional state. The system is configured to compare the user's baseline with input audio representing speech from the user to determine a emotion of the user. The system may store multiple baselines for the user, each associated with a different context (e.g., environment, activity, etc.), and select one of the baselines to compare with the input audio based on the contextual situation.

18 Claims, 16 Drawing Sheets

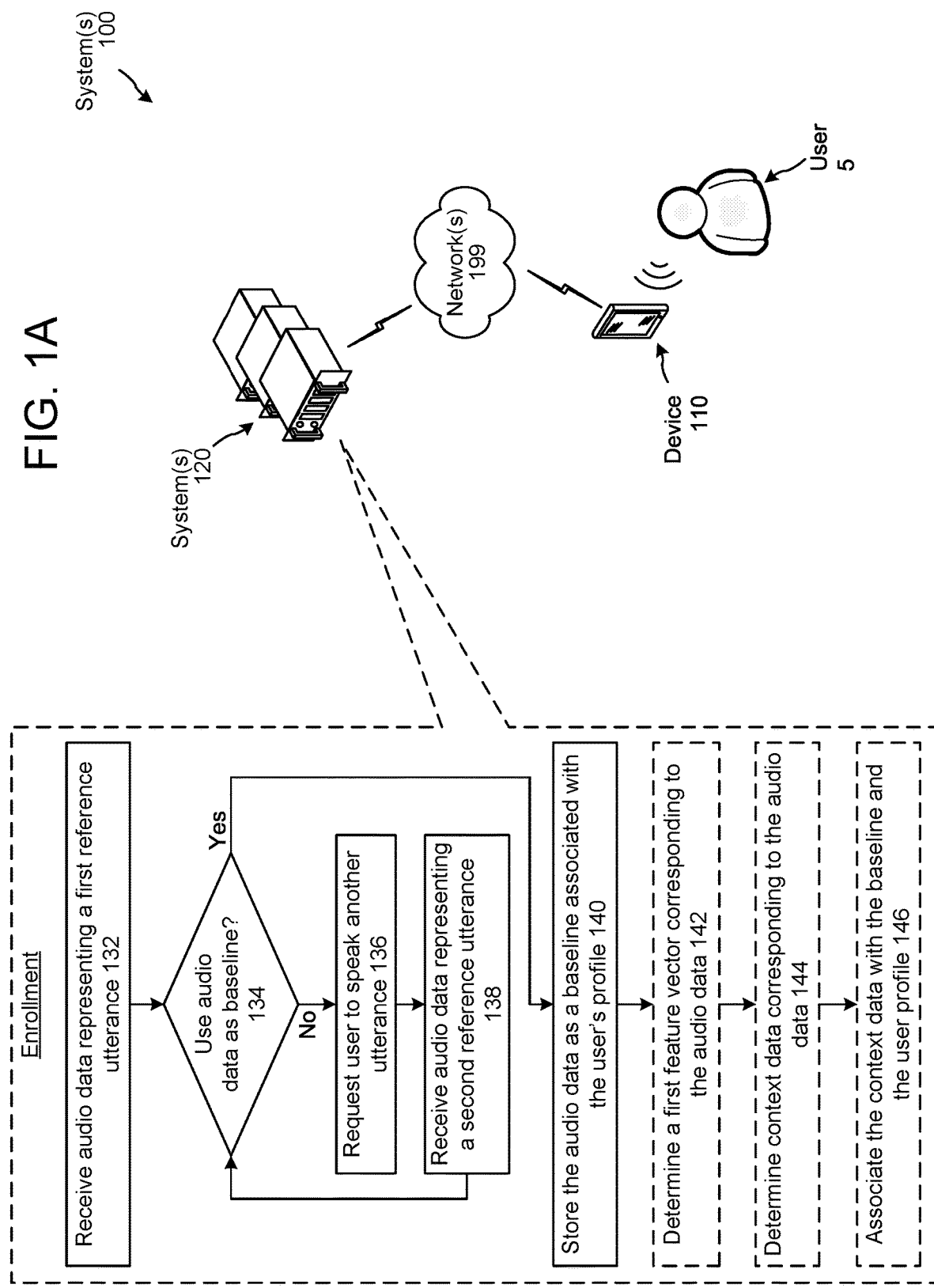

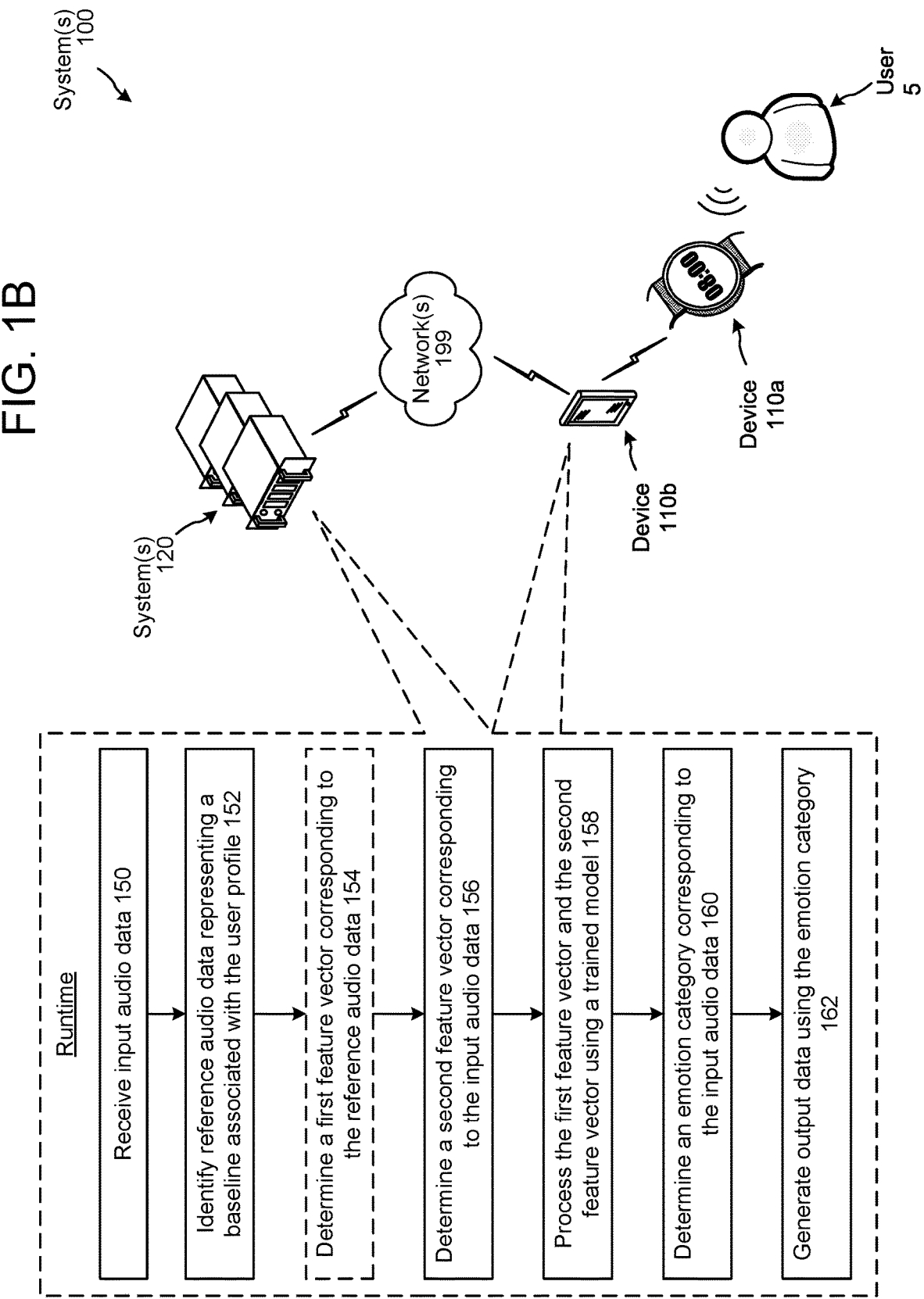

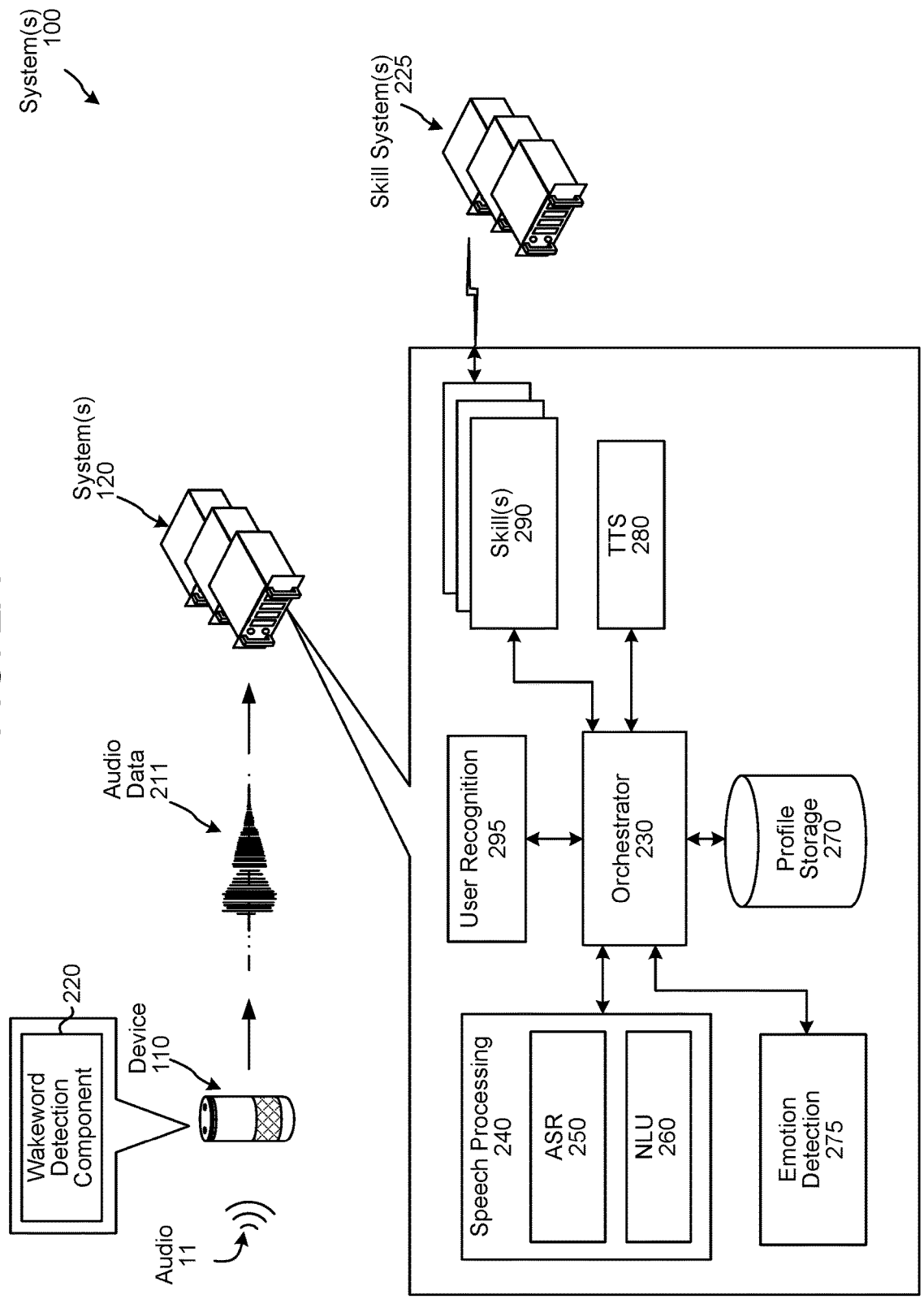

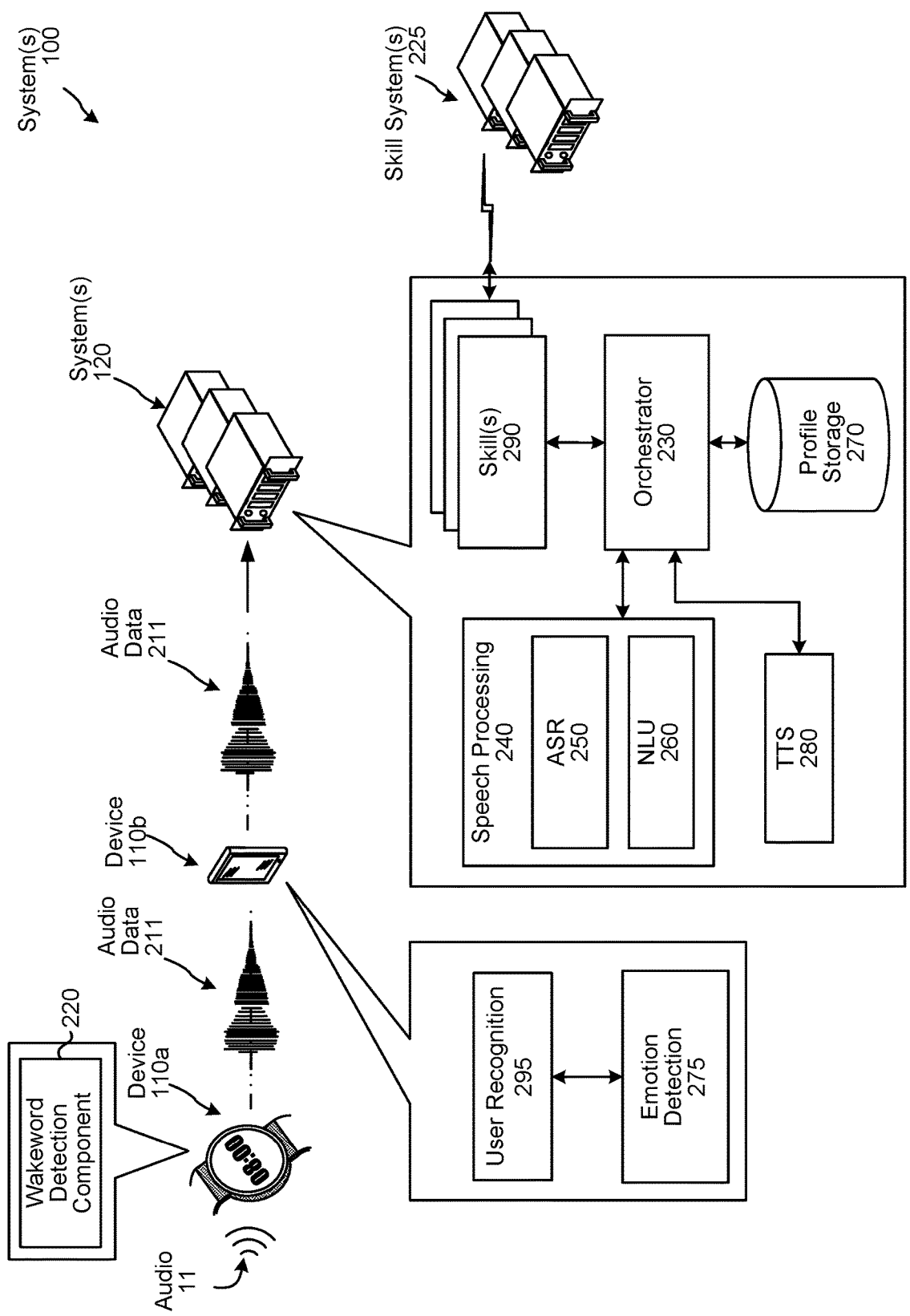

EMOTION DETECTION USING SPEAKER BASELINE

CROSS-REFERENCE TO RELATED APPLICATION

This application is a continuation of, and claims the benefit of priority of, U.S. Non-Provisional patent application Ser. No. 16/456,158, filed Jun. 28, 2019, titled "EMOTION DETECTION USING SPEAKER BASELINE", and scheduled to issue as U.S. Pat. No. 10,943,604, which is hereby incorporated by reference in its entirety.

BACKGROUND

Speech recognition systems have progressed to the point where humans can interact with computing devices using their voices. Such systems employ techniques to identify the words spoken by a human user based on the various qualities of a received audio input. The audio input may also indicate an emotion or sentiment of the user when speaking the words.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to enroll a user for detecting emotion in audio data according to embodiments of the present disclosure.

FIG. 1B illustrates a system configured to detect emotion in audio data according to embodiments of the present disclosure.

FIGS. 2A and 2B are conceptual diagrams of speech processing components of a system according to embodiments of the present disclosure.

DETAILED DESCRIPTION

Figure 3:
FIG. 3 is a schematic diagram of an illustrative architecture in which sensor data is combined to recognize one or more users according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play music," a system may output music. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

Sentiment analysis using speech may involve determining a person's sentiment, view and/or attitude towards a situation/topic. A person's sentiment may be derived from which words the persons uses to express his/hers opinions. Emotion analysis using speech may involve determining a person's state of mind, emotions, feelings and/or mood. A person's emotions may be derived from how the person says the words and the acoustic properties of the person's speech. The present system may be configured to classify audio data, for example, speech from a user, based on emotion and/or sentiment derived from the audio data and based on the user's baseline representing a neutral emotion/sentiment. The system can use a baseline, for example, to help capture a speaker's personalized speaking style and associated characteristics. The speaking style, as used herein, may be represented by acoustic speech attributes such as pitch, speed, rate, accent, tone, stress, rhythm, intonation, volume, and the like. The baseline, as used herein, may refer to (reference) audio data representing a speaker's neutral emotional state. By using an individual speaker's baseline speech data the system may make a more accurate determination of the individual user's emotion during runtime. For example, a typically loud speaker may be perceived as being angry by the system, until compared to the speaker's baseline. In another example, a typically soft speaker may be perceived as being timid or sad by the system, until compared to the speaker's baseline. The system may determine a user's sentiment/emotion based on an analysis of the user's baseline and the runtime input audio data indicating differences between the input audio data and the baseline.

The system may determine a baseline using enrollment utterances spoken the user. The system may determine whether an enrollment utterance represents the user's neutral emotional state and can be used as a baseline. The system may also be configured to obtain multiple baselines for different environments or activities the speaker may engage. Different environments or activities may cause a speaker to exhibit different neutral emotional states. For example, the speaker's baseline may be different when he or she is at work versus when he or she is at home. Similarly, the speaker's baseline may be different when he or she is speaking to co-workers versus when he or she is speaking to family or children. As another example, the speaker's baseline may be different when he or she is speaking at night versus when he or she is speaking in the morning. The different baselines may capture the different acoustic speech attributes exhibited by the user in various situations/contexts.

The system may also be configured to select the appropriate baseline for analysis with input audio data for emotion/sentiment detection based on the environment or activity the user is engaged in while speaking the utterance represented in the runtime input audio data to be analyzed.

The system may incorporate user permissions and may only perform functionalities disclosed herein, such as emotion detection, if approved by a user, and may configure emotion detection per the user permissions/preferences. As disclosed herein, a user may enroll with the system for emotion detection by providing utterances for reference. For example, the system may perform emotion detection on the speech spoken by the user who opt-in and is associated with the capturing device (and not on speech captured from other users). As such, the systems, devices, components, and techniques described herein may restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located. The system may delete all data relating to emotion detection after a period of time and/or after the audio data has been analyzed and output has been presented and/or viewed by the user. The user may also request the system to delete all data relating to emotion detection. The system may limit access to data relating to emotion detection according to the user permissions selected by the user.

The present system may process input audio data to determine if the audio data includes voice activity from a human user (e.g., speech). Then the system may identify portions of the input audio data that represents speech from a particular user. The portions of the input audio data may be processed using a trained machine learning (ML) model to predict an emotion category for the audio data. The emotion category may be used in various applications. For example, the emotion category may be displayed to a user to indicate his or her emotions during interactions with other persons, and/or to indicate his or her emotion during particular times of the day. The emotion category may also be used by application developers for voice-activated systems or smart speaker systems to identify emotions and/or sentiments of a user while interacting with the voice-activated system or smart speaker system. The application developer may be able to determine a user's satisfaction of his or her interactions with the voice-activated system or smart speaker system. For example, a gaming application developer may determine if the user's emotions while he or she is playing or interacting with a game. As another example, the user's emotions while watching or hearing a commercial can be used for marketing research. In yet another example, a voice-activated system or smart speaker system included in a vehicle can analyze a driver's emotions from audio data, and inform the driver if he or she appears to be agitated, frustrated or angry that his or her sentiments/emotions may affect his or hers driving. Assuming user permission, other components may also receive emotion data for different operations.

In an example embodiment, a user may be wearing or otherwise carrying a device that detects audio data and initiates analysis of the audio data when voice activity is detected. The user may configure the device to monitor his or her speech interactions with other persons throughout the day. The system may determine an emotional state of the user for various interactions, and generate a periodic report for the user. The report may be stored and/or may be displayed to the user, such as on a wearable device, phone, tablet, or other device.

FIG. 1A illustrates a system 100 configured to enroll a user for emotion detection in audio data according to embodiments of the present disclosure. FIG. 1B illustrates a system 100 configured to detect emotion in audio data according to embodiments of the present disclosure. Although the figures and discussion illustrate certain operational steps of the system in a particular order, the steps described may be performed in a different order (as well as certain steps removed or added) without departing from the intent of the disclosure. As illustrated in FIGS. 1A and 1B, the system 100 may include a device 110 local to a user 5, and one or more systems 120 connected across one or more networks 199. As illustrated in FIG. 1A, the device 110a may be in communication with device 110b. As illustrated, the processes described with respect to FIG. 1A may be performed during enrollment operations (when the system 100 is configured to obtain reference audio data from the user 5 for emotion detection using a baseline) and processes described with respect to FIG. 1B may be performed during runtime operations (when the configured system 100 processes input audio data to detect a emotion).

During the enrollment process, the system(s) 120 is configured to obtain audio data representing a neutral emotional state of a user. As shown in FIG. 1A, the system(s) 120 receives (132) audio data representing a first reference utterance. The user 5 may speak an utterance captured by device 110 that is represented by the audio data. As part of the enrollment process, the system(s) 120 may cause the device 110 to output audio requesting the user 5 to speak certain sentences. In some embodiments, the device 110 may output a specific sentence for the user 5 to speak, for example, "for enrollment purposes, please say I love the weather today," and the user 5 may say "I love the weather today." The system(s) 120 may store the audio data representing the reference utterance spoken by the user 5.

The system(s) 120 determines (134) if the audio data can be used as a baseline. The system(s) 120 may determine if the audio data represents the user's 5 neutral emotional state. The system(s) 120 may analyze the audio data to determine if the corresponding acoustic speech attributes are within a predefined range or satisfy certain conditions that indicate a neutral emotional state. For example, the system(s) 120 may have identified and stored acoustic speech attributes representing a neutral emotional state based on analyzing audio data from multiple users/a general population, and may use these acoustic speech attributes to determine if the audio data (from operation 132) aligns with these attributes so that the audio data represents a neutral emotional state of the user 5. In some embodiments, the system(s) 120 may process the audio data using a machine learning (ML) model configured to determine an emotion category corresponding to the audio data. The ML model may determine that the emotion category corresponding to the audio data is neutral. In some embodiments, the system(s) 120 may also determine if the quality of the audio data is good enough to use as the baseline.

If the system(s) 120 determines that the audio data cannot be used as a baseline, then the system(s) 120 requests (136) the user 5 to speak another utterance. The system(s) 120 may request the user 5 to repeat the previously presented sentence by outputting, for example, "please repeat I love the weather today" or the system(s) 120 may request the user 5 to say a different sentence. The system(s) 120 receives (138) audio data representing a second reference utterance, and goes back to operation 134 to determine if the audio data can be used as a baseline (representing a neutral emotional state of the user).

In some embodiments, the system(s) 120 may only make a few attempts to obtain audio data for a baseline. That is, the operation of step 136 may be performed for a limited number of times (e.g., twice or thrice) before the system(s) 120 realizes that it is unable to obtain audio data from user 5 to use as a baseline. The system(s) 120 may cause the device 110 to output "something isn't right, let's try to enroll at another time." The audio data may not be of good quality because of background noises or the audio data may not represent the user's neutral emotional state (for example, the user may be too excited or angry during the enrollment process).

If the system(s) 120 determines that the audio data can be used as a baseline, then the system(s) 120 stores (140) the audio data as a baseline associated with a user profile corresponding to the user 5. The system(s) 120 may store the audio data as the baseline in a profile storage 270. The system(s) may determine (142) a first feature vector corresponding to the audio data, and may store the first feature vector as the baseline. The first feature vector may represent spectral features derived from the audio data. The system(s) 120 may use an encoder (e.g., encoder 1150 of FIG. 11) to process frames of the audio data and generate the first feature vector. In some embodiments the first feature vector may represent acoustic speech attributes (e.g., accent, pitch, prosody, etc.) exhibited by the user 5 in a neutral emotional state.

The system(s) 120 may be configured to obtain multiple baselines representing the user's neutral emotional state in various circumstances. As such, the profile storage 270 may include audio data representing multiple baselines for the user 5. In some embodiments, to obtain various baselines the system(s) 120 may request the user 5 to speak while in different environments or while interacting with different people. The system(s) 120 may request the user's permission to record audio (for a limited period of time for enrollment purposes) while the user 5 is speaking in different environments or while the user is interacting with different people to capture audio data representing the user's emotional state in different situations. For example, the user 5 may exhibit different speaking styles/acoustic speech attributes when at home versus at work. Similarly, the user 5 may exhibit different speaking styles/acoustic speech attributes when speaking to family (spouse, significant other, children, pets, etc.) versus co-workers.

In such cases, the system(s) 120 may determine (144) context data corresponding to the audio data, and may associate (146) the context data with the baseline and the user profile. The context data corresponding to the audio data/baseline, as used herein, refers to data indicating an environment and/or situation associated with the user when the audio data was received. For example, the system(s) 120 may determine where the user 5 was when speaking the reference utterance (e.g., using the device's 110 location). If appropriate permissions and settings are configured to allow the operation, the system(s) 120 may determine with whom the user 5 was interacting with when speaking the utterance. In some embodiments, the system(s) 120 may receive input data from the user 5 indicating the context data such as the user's location (e.g., home, work, gym, etc.), with whom the user is interacting with (e.g., co-workers, boss, spouse/significant other, children, neighbors, etc.), and the like. As a non-limiting example, the system(s) 120 may store first audio data representing a first baseline in the profile storage 270 along with context data indicating <location: work>, second audio data representing a second baseline along with context data indicating <location: home>, third audio data representing a third baseline along with context data indicating <person: co-worker>, fourth audio data representing a fourth baseline along with context data indicating <person: daughter>, and so on.

To obtain the baseline, in some embodiments, the device 110 may output a specific sentence for the user 5 to speak, for example, "for enrollment purposes, please say I love the weather today," and the user 5 may say "I love the weather today." In some embodiments, the system(s) 120 may request the user 5 to speak about a topic, rather than requesting the user 5 to speak a certain sentence. For example, the device 110 may output "for enrollment purposes, please tell me how you feel about the weather today?" and the user 5 may say "it is raining today and I don't like it when it rains." The system(s) 120 may store the audio data representing the reference utterances spoken by the user 5. In some embodiments, the system(s) 120 may request the user 5 to say a specific sentence and also talk about a topic to capture audio data for both situations because a user may exhibit different speaking styles/acoustic speech attributes when repeating a sentence versus talking freely about a topic. The system(s) 120 may process the audio data representing the user saying a specific sentence and the audio data representing the user freely talking about a topic to determine an appropriate baseline, for example, using the differences in the acoustic speech attributes for the two situations, the average (weighted or unweighted) of the acoustic speech attributes for the two situations, statistical analysis, a machine learning model to process the corresponding feature vectors, and/or using other methods.

In this manner, the system(s) 120 during the enrollment process illustrated in FIG. 1A obtains audio data representing the user's 5 neutral emotional state. The system(s) 120 may perform the operations shown in FIG. 1A multiple times to obtain multiple baselines representing different circumstances that the user may be in and that the user has opt-in for emotion detection. Further details of the enrollment process are described in connection with FIG. 5.

During runtime, as shown in FIG. 1B, system(s) 120 receives (150) input audio data. The input audio data may be captured by the device 110a and may include speech or sounds from the user 5 and/or speech and sounds from at least one other person. As described below (in connection with FIG. 6), the speech/sounds from the other person included in the input audio data may be isolated and discarded prior to further processing. The device 110a may be in communication with a device 110b, and may send the input audio data to the device 110b. FIG. 1B shows device 110a as a smartwatch, however, device 110a may be any wearable device or any device carried by the user 5 and configured to capture audio data when the appropriate user permissions are met. The device 110b is shown as a smartphone, however, device 110b may be any mobile device or computing device such as a laptop, tablet, desktop, etc. that is in communication with the device 110a and configured to receive data from and send data to device 110a. Alternatively, the device 110a may be a voice-activated system or smart speaker, and may send input audio data directly to the system(s) 120 rather than forwarding via a device 110b. Alternatively the operations of devices 110a and 110b may be combined into a single device. The device 110 of FIG. 1A used for the enrollment process may be different than the device 110a used during runtime, as such the user 5 may use a different device to enroll in emotion detection than the one used to provide input audio.

The system(s) 120 identifies (152) reference audio data representing a baseline associated with the user profile of the user 5. The system(s) 120 may retrieve the reference audio data from the profile storage 270.

As described above, in some embodiments the profile storage 270 may store multiple baselines for the user 5, where each baseline may correspond to a different context/circumstance. The system(s) 120 may identify a baseline from the multiple baselines associated with the user profile based on the context data associated with the baseline and the context data associated with the input audio data. The system(s) 120 may determine context data corresponding to the input audio data, such as the location of the user (e.g., using the device's 110a location), the person he/she is interacting with, and the like. The system(s) 120 may select the baseline with context data that is similar to the context data of the input audio data, thus, using an appropriate baseline to account for the user exhibiting different speaking styles/acoustic speech attributes in different situations. In other embodiments, the system(s) 120 may analyze (e.g., using a ML model, statistical analysis, or other methods) features corresponding to the reference audio data for the baselines and the input audio data to identify a baseline with features similar to the input audio data. In some embodiments, if the system(s) 120 cannot identify a baseline with context data that is similar to the input audio data's context data, then the system(s) 120 may select the best baseline available based on the quality of the baseline (e.g., audio quality, quality of the acoustic features, the best representation of a neutral emotional state, etc.).

The system(s) 120 may then determine (154) a first feature vector corresponding to the reference audio data, if this operation was not already performed during the enrollment process (operation 142). The first feature vector may represent spectral features derived from the reference audio data. The system(s) 120 may use an encoder (e.g., encoder 1150 of FIG. 11) to process frames of the reference audio data and generate the first feature vector. In some embodiments the first feature vector may represent acoustic speech attributes (e.g., accent, pitch, prosody, etc.) exhibited by the user 5 in a neutral emotional state.

The system(s) 120 determine (156) a second feature vector corresponding to the input audio data. The second feature vector may represent spectral features derived from the input audio data. The system(s) 120 may use an encoder (e.g., encoder 1150 of FIG. 11) to process frames of the input audio data and generate the second feature vector. In some embodiments the second feature vector may represent acoustic speech attributes (e.g., accent, pitch, prosody, etc.) exhibited by the user 5 while speaking the utterance represented by the input audio data.

The system(s) 120 processes (158) the first feature vector and the second feature vector using a trained model. The trained model may output one or more scores. The system(s) 120 determines (160) an emotion category based on the scores generated by the trained model. The trained model may be a ML model configured to process features of reference audio data and input audio data to determine an emotion category corresponding to the input audio data based on the user's neutral emotional state (represented by the reference audio data). The emotion categories may include broad categories such as positive, neutral, and negative. In other embodiments, the emotion categories may be more specific and may include, for example, anger, happiness, sadness and neutral. In another embodiment, the emotion categories may include anger, sad, happy, surprised, stress, and disgust. As can be appreciated, various emotion categories/indicators are possible depending on the system configuration.

In some embodiments, the system(s) 120 may determine that the input audio data represents voice activity from a human. The system(s) 120 may identify a voice profile associated with a user profile of the device 110. The system(s) 120 may retrieve stored data associated with the user profile. The stored data may include a voice fingerprint or voice biomarker to identify a user using the audio data. In other embodiments, the stored data may include a RF data, location data, machine vision data, and the like described in connection with user recognition component 295. The system(s) 120 may identify the voice profile using the user recognition component 295 described herein.

The system(s) 120 may determine a first portion of the input audio data, where the first portion corresponds to the voice profile. For example, the input audio data may capture speech from multiple persons, especially if user 5 is conversing with another person. The system(s) 120 may isolate the first portion of the input audio data associated with speech spoken by user 5, and store the first portion for further analysis. The system(s) 120 may determine the feature vector (in operation 156) using the first portion of the input audio data.

The system(s) 120 may store association data associating the emotion category with the input audio data and the user profile. In an example embodiment, the system(s) 120 may analyze input audio data during a period of time, and determine an emotion category at various time intervals to provide the user information on his or her emotional state during the period of time or while interacting with other persons. In another embodiment, the system(s) 120 may analyze input audio data while the user interacts with the device 110, and the emotion category may indicate the user's satisfaction with his or her interactions with the device 110.

The system(s) 120 generates (162) output data including at least the emotion category and a portion of the input audio data. The system(s) 120 may determine text data corresponding to the audio data frame using the ASR processing techniques described below. The system(s) 120 may also determine time data indicating when the portion of the input audio data is received by the device 110. The output data may include the text data corresponding to the portion of input audio data, the time data, and an indicator of the emotion category. The output data may be displayed on the device 110a or the device 110b. The indicator of the emotion category may be text representing the emotion category, an icon representing the emotion category, or other indicators.

The operations of FIG. 1B are generally described herein as being performed by the system(s) 120. However, it should be understood that one or more of the operations may also be performed by the device 110a, device 110b, or other device. Further details of the runtime operations are described in connection with FIG. 6.

The overall system of the present disclosure may operate using various components as illustrated below. The various components may be located on same or different physical devices. Communication between various components may occur directly or across a network(s) 199.

As shown in FIGS. 2A and 2B, an audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120 as shown in FIG. 2A. As shown in FIG. 2B, the device 110a may transmit audio data 211 to device 110b, and the device 110b may transmit audio data 211 to the system(s) 120. The audio data 211 may include data corresponding to the wakeword, or the portion of the audio corresponding to the wakeword may be removed by the device 110a prior to sending the audio data 211 to the system(s) 120. In some embodiments, the device 110a may begin transmitting audio data 211 to system(s) 120/device 110b (or otherwise performing further processing on audio data) in response to an event occurring or an event being detected by the device 110a.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The profile storage 270 may include audio data representing one or more baselines corresponding to a neutral emotional state of the user. The profile storage 270 may include data related to multiple baselines, each associated with different context data.

The system(s) 120 may also include an emotion detection component 275 that may be configured to detect an emotion of a user from audio data representing speech/utterances from the user. The emotion detection component 275 may be included in the speech processing component 240 or may be a separate component as illustrated in FIG. 2A. The emotion detection component 275 and other components are generally described as being operated by the system(s) 120.

However, the device 110 may also operate one or more of the components, including the emotion detection component 275.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located. The user may delete any data stored in the profile storage 270, for example, data related to one or more baselines (baseline data), emotion detection, etc.

The system(s) 120 may include a user recognition component 295 that recognizes one or more users using a variety of data. As illustrated in FIG. 3, the user recognition component 295 may include one or more subcomponents including a vision component 308, an audio component 310, an identification component 312, a radio frequency (RF) component 314, a machine learning (ML) component 316, and a recognition confidence component 318. In some instances, the user recognition component 295 may monitor data and determinations from one or more subcomponents to determine an identity of one or more users associated with data input to the system(s) 120. The user recognition component 295 may output user recognition data 395, which may include a user identifier associated with a user that the user recognition component 295 believes originated data input to the system(s) 120. The user recognition data 395 may be used to inform processes performed by various components of the system(s) 120.

The vision component 308 may receive data from one or more sensors capable of providing images (e.g., cameras) or sensors indicating motion (e.g., motion sensors). The vision component 308 can perform facial recognition or image analysis to determine an identity of a user and to associate that identity with a user profile associated with the user. In some instances, when a user is facing a camera, the vision component 308 may perform facial recognition and identify the user with a high degree of confidence. In other instances, the vision component 308 may have a low degree of confidence of an identity of a user, and the user recognition component 295 may utilize determinations from additional components to determine an identity of a user. The vision component 308 can be used in conjunction with other components to determine an identity of a user. For example, the user recognition component 295 may use data from the vision component 308 with data from the audio component 310 to identify what user's face appears to be speaking at the same time audio is captured by a device 110 the user is facing for purposes of identifying a user who spoke an input to the system(s) 120.

The overall system 100 of the present disclosure may include biometric sensors that transmit data to the identification component 312. For example, the identification component 312 may receive data corresponding to fingerprints, iris or retina scans, thermal scans, weights of users, a size of a user, pressure (e.g., within floor sensors), etc., and may determine a profile corresponding to a user. The identification component 312 may distinguish between a user and sound from a television, for example. Thus, the identification component 312 may incorporate identification information into a confidence level for determining an identity of a user. Identification information output by the identification component 312 can be associated with specific user profile data such that the identification information uniquely identifies a user profile of a user.

The RF component 314 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 314 the strength of the signal (e.g., as a received signal strength indication (RSSI)). The RF component 314 may use the RSSI to determine an identity of a user (with an associated confidence level). In some instances, the RF component 314 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 316 may track the behavior of various users as a factor in determining a confidence level of the identity of the user. By way of example, a user may adhere to a regular schedule such that the user is at a first location during the day (e.g., at work or at school). In this example, the ML component 316 would factor in past behavior and/or trends in determining the identity of the user that provided input to the system(s) 120. Thus, the ML component 316 may use historical data and/or usage patterns over time to increase or decrease a confidence level of an identity of a user.

In at least some instances, the recognition confidence component 318 receives determinations from the various components 308, 310, 312, 314, and 316, and may determine a final confidence level associated with the identity of a user. In some instances, the confidence level may determine whether an action is performed in response to a user input. For example, if a user input includes a request to unlock a door, a confidence level may need to satisfy or be above a threshold that may be higher than a threshold confidence level needed to perform a user request associated with playing a playlist or sending a message. The confidence level or other score data may be included in the user recognition data 395.

The audio component 310 may receive data from one or more sensors capable of providing an audio signal (e.g., one or more microphones) to facilitate recognition of a user. The audio component 310 may perform audio recognition on an audio signal to determine an identity of the user and associated user identifier. In some instances, aspects of the system(s) 120 may be configured at a computing device (e.g., a local server). Thus, in some instances, the audio component 310 operating on a computing device may analyze all sound to facilitate recognition of a user. In some instances, the audio component 310 may perform voice recognition to determine an identity of a user.

The audio component 310 may also perform user identification based on audio data 211 input into the system(s) 120 for speech processing. The audio component 310 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 310 may perform user recognition by comparing speech characteristics represented in the audio data 211 to stored speech characteristics of users (e.g., stored voice profiles associated with the device 110 that captured the spoken user input).

As shown in FIG. 2B, the emotion detection component 275 and the user recognition component 295 may be included in the device 110b. The device 110a may transmit audio data 211 to device 110b. Upon receipt, the device 110b may send the audio data 211 to the user recognition component 295 to perform the operations described herein in relation to component 295, for example, including identifying a user profile corresponding to the audio data 211. The user recognition component 295 may send data to the emotion detection component 275 to perform operations described herein.

Figure 4:
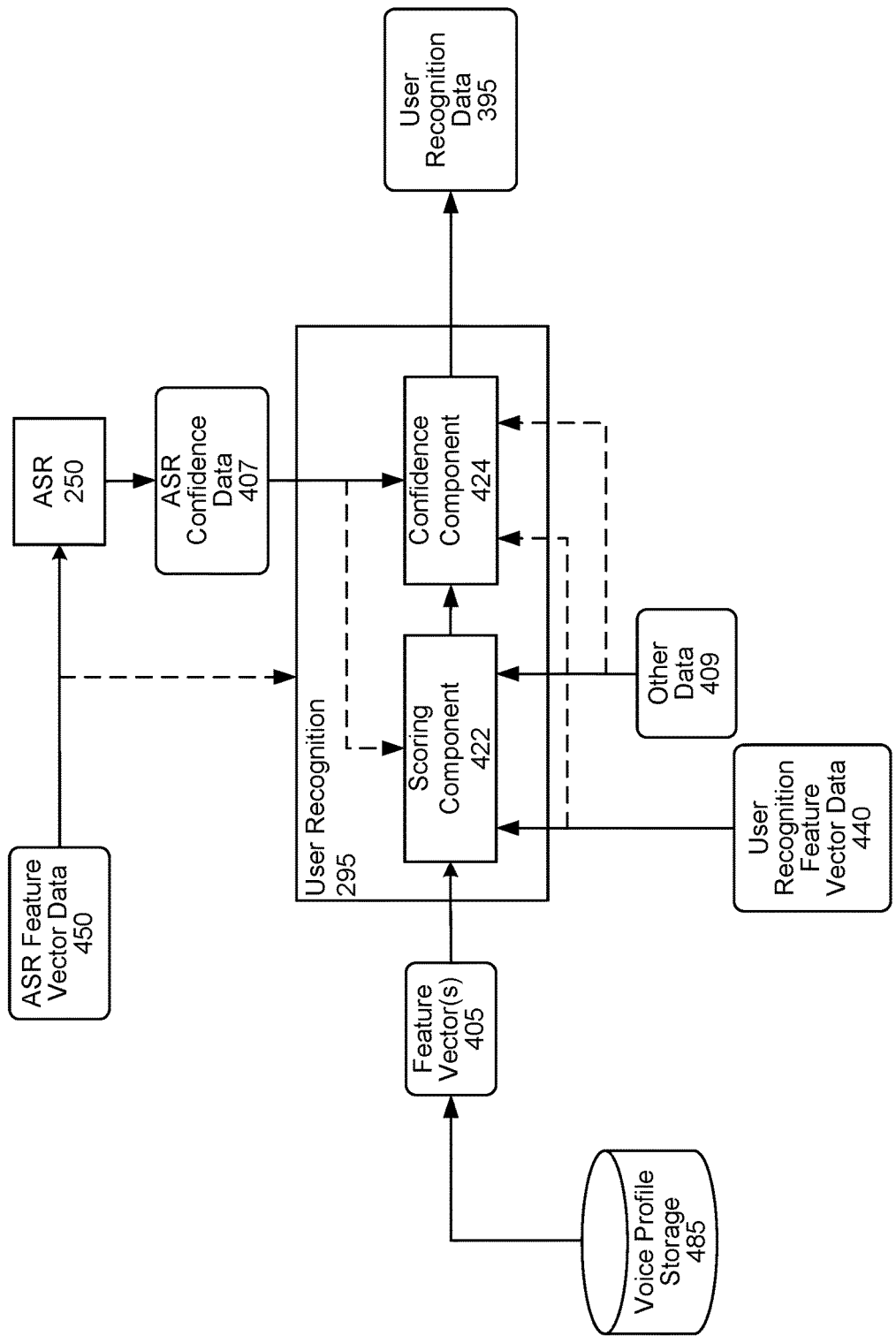
FIG. 4 is a system flow diagram illustrating user recognition according to embodiments of the present disclosure.

FIG. 4 illustrates user recognition processing as may be performed by the user recognition component 295. The ASR component 250 performs ASR processing on ASR feature vector data 450. ASR confidence data 407 may be passed to the user recognition component 295.

The user recognition component 295 performs user recognition using various data including the user recognition feature vector data 440, feature vectors 405 representing voice profiles of users of the system(s) 120, the ASR confidence data 407, and other data 409. The user recognition component 295 may output the user recognition data 395, which reflects a certain confidence that the user input was spoken by one or more particular users. The user recognition data 395 may include one or more user identifiers (e.g., corresponding to one or more voice profiles). Each user identifier in the user recognition data 395 may be associated with a respective confidence value, representing a likelihood that the user input corresponds to the user identifier. A confidence value may be a numeric or binned value.

The feature vector(s) 405 input to the user recognition component 295 may correspond to one or more voice profiles. The user recognition component 295 may use the feature vector(s) 405 to compare against the user recognition feature vector 440, representing the present user input, to determine whether the user recognition feature vector 440 corresponds to one or more of the feature vectors 405 of the voice profiles. Each feature vector 405 may be the same size as the user recognition feature vector 440.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system(s) 120 may determine a group profile identifier associated with the device identifier, may determine user identifiers associated with the group profile identifier, and may include the group profile identifier and/or the user identifiers in the metadata. The system(s) 120 may associate the metadata with the user recognition feature vector 440 produced from the audio data 211. The user recognition component 295 may send a signal to voice profile storage 485, with the signal requesting only audio data and/or feature vectors 405 (depending on whether audio data and/or corresponding feature vectors are stored) associated with the device identifier, the group profile identifier, and/or the user identifiers represented in the metadata. This limits the universe of possible feature vectors 405 the user recognition component 295 considers at runtime and thus decreases the amount of time to perform user recognition processing by decreasing the amount of feature vectors 405 needed to be processed. Alternatively, the user recognition component 295 may access all (or some other subset of) the audio data and/or feature vectors 405 available to the user recognition component 295. However, accessing all audio data and/or feature vectors 405 will likely increase the amount of time needed to perform user recognition processing based on the magnitude of audio data and/or feature vectors 405 to be processed.

If the user recognition component 295 receives audio data from the voice profile storage 485, the user recognition component 295 may generate one or more feature vectors 405 corresponding to the received audio data.

The user recognition component 295 may attempt to identify the user that spoke the speech represented in the audio data 211 by comparing the user recognition feature vector 440 to the feature vector(s) 405. The user recognition component 295 may include a scoring component 422 that determines respective scores indicating whether the user input (represented by the user recognition feature vector 440) was spoken by one or more particular users (represented by the feature vector(s) 405). The user recognition component 295 may also include a confidence component 424 that determines an overall accuracy of user recognition processing (such as those of the scoring component 422) and/or an individual confidence value with respect to each user potentially identified by the scoring component 422. The output from the scoring component 422 may include a different confidence value for each received feature vector 405. For example, the output may include a first confidence value for a first feature vector 405a (representing a first voice profile), a second confidence value for a second feature vector 405b (representing a second voice profile), etc. Although illustrated as two separate components, the scoring component 422 and the confidence component 424 may be combined into a single component or may be separated into more than two components.

The scoring component 422 and the confidence component 424 may implement one or more trained machine learning models (such as neural networks, classifiers, etc.) as known in the art. For example, the scoring component 422 may use probabilistic linear discriminant analysis (PLDA) techniques. PLDA scoring determines how likely it is that the user recognition feature vector 440 corresponds to a particular feature vector 405. The PLDA scoring may generate a confidence value for each feature vector 405 considered and may output a list of confidence values associated with respective user identifiers. The scoring component 422 may also use other techniques, such as GMMs, generative Bayesian models, or the like, to determine confidence values.

The confidence component 424 may input various data including information about the ASR confidence 407, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 424 may also consider the confidence values and associated identifiers output by the scoring component 422. For example, the confidence component 424 may determine that a lower ASR confidence 407, or poor audio quality, or other factors, may result in a lower confidence of the user recognition component 295. Whereas a higher ASR confidence 407, or better audio quality, or other factors, may result in a higher confidence of the user recognition component 295. Precise determination of the confidence may depend on configuration and training of the confidence component 424 and the model(s) implemented thereby. The confidence component 424 may operate using a number of different machine learning models/techniques such as GMM, neural networks, etc. For example, the confidence component 424 may be a classifier configured to map a score output by the scoring component 422 to a confidence value.

The user recognition component 295 may output user recognition data 395 specific to a one or more user identifiers. For example, the user recognition component 295 may output user recognition data 395 with respect to each received feature vector 405. The user recognition data 395 may include numeric confidence values (e.g., 0.0-1.0, 0-1000, or whatever scale the system is configured to operate). Thus, the user recognition data 395 may output an n-best list of potential users with numeric confidence values (e.g., user identifier 123—0.2, user identifier 234—0.8). Alternatively or in addition, the user recognition data 395 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123— low, user identifier 234—high). Combined binned and numeric confidence value outputs are also possible. Rather than a list of identifiers and their respective confidence values, the user recognition data 395 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 424 may determine the overall confidence value.

The confidence component 424 may determine differences between individual confidence values when determining the user recognition data 395. For example, if a difference between a first confidence value and a second confidence value is large, and the first confidence value is above a threshold confidence value, then the user recognition component 295 is able to recognize a first user (associated with the feature vector 405 associated with the first confidence value) as the user that spoke the user input with a higher confidence than if the difference between the confidence values were smaller.

The user recognition component 295 may perform thresholding to avoid incorrect user recognition data 395 being output. For example, the user recognition component 295 may compare a confidence value output by the confidence component 424 to a threshold confidence value. If the confidence value does not satisfy (e.g., does not meet or exceed) the threshold confidence value, the user recognition component 295 may not output user recognition data 395, or may only include in that data 395 an indicator that a user that spoke the user input could not be recognized. Further, the user recognition component 295 may not output user recognition data 395 until enough user recognition feature vector data 440 is accumulated and processed to verify a user above a threshold confidence value. Thus, the user recognition component 295 may wait until a sufficient threshold quantity of audio data of the user input has been processed before outputting user recognition data 395. The quantity of received audio data may also be considered by the confidence component 424.

The user recognition component 295 may be defaulted to output binned (e.g., low, medium, high) user recognition confidence values. However, such may be problematic in certain situations. For example, if the user recognition component 295 computes a single binned confidence value for multiple feature vectors 405, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 409 to inform user recognition processing. A trained model(s) or other component of the user recognition component 295 may be trained to take other data 409 as an input feature when performing user recognition processing. Other data 409 may include a variety of data types depending on system configuration and may be made available from other sensors, devices, or storage. The other data 409 may include a time of day at which the audio data 211 was generated by the device 110 or received from the device 110, a day of a week in which the audio data audio data 211 was generated by the device 110 or received from the device 110, etc.

The other data 409 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 440 and one or more feature vectors 405 to perform more accurate user recognition processing.

The other data 409 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 409 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 409 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 409 may include data representing activity of a particular user that may be useful in performing user recognition processing. For example, a user may have recently entered a code to disable a home security alarm. A device 110, represented in a group profile associated with the home, may have generated the audio data 211. The other data 409 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 409 and considered by the user recognition component 295.

Depending on system configuration, the other data 409 may be configured to be included in the user recognition feature vector data 440 so that all the data relating to the user input to be processed by the scoring component 422 may be included in a single feature vector. Alternatively, the other data 409 may be reflected in one or more different data structures to be processed by the scoring component 422.

Figure 5:
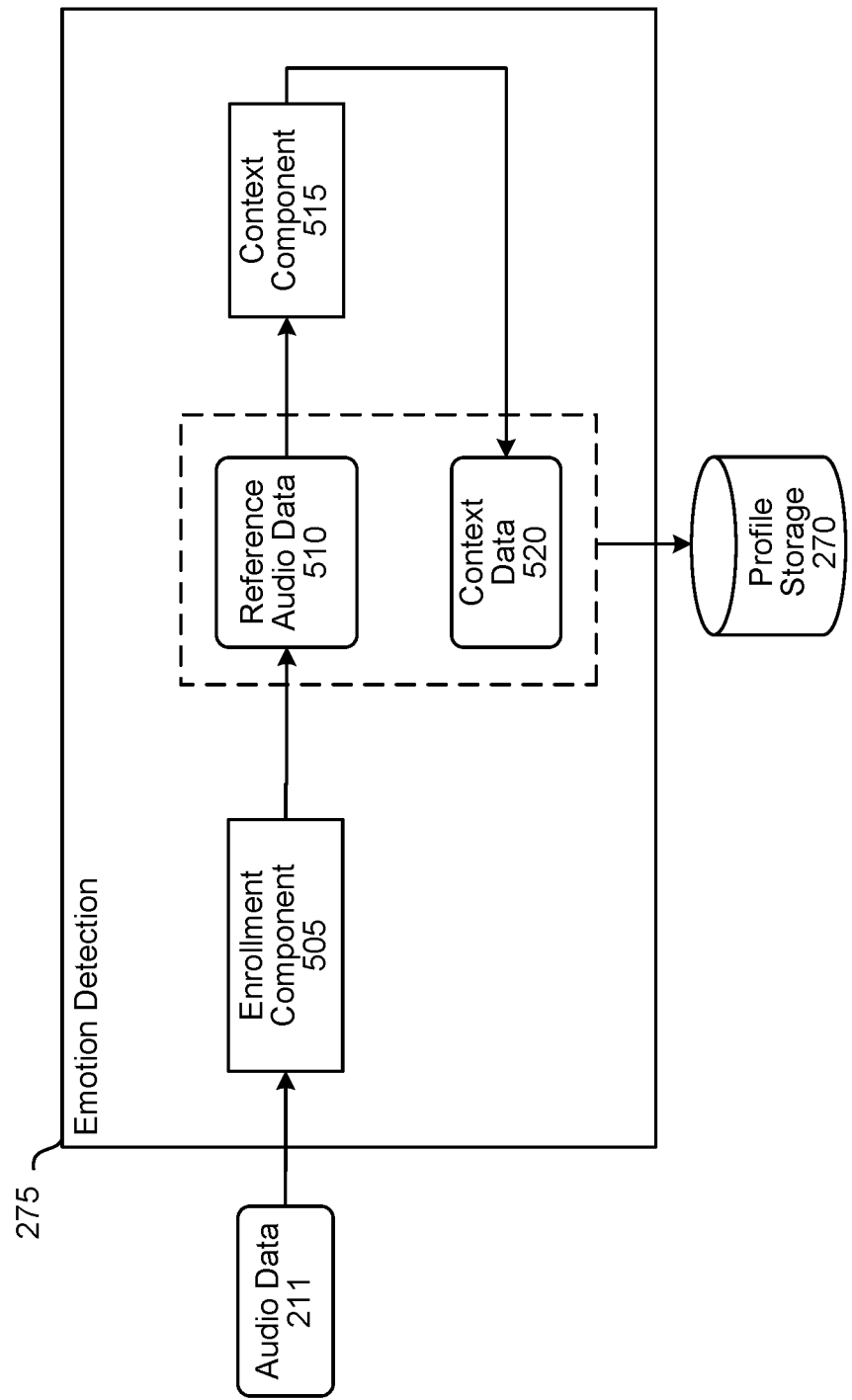
FIG. 5 is a conceptual diagram illustrating an emotion detection component for user enrollment according to embodiments of the present disclosure.

FIG. 5 is a conceptual diagram illustrating an emotion detection component including components for user enrollment according to embodiments of the present disclosure. In some embodiments, the emotion detection component 275 may include an enrollment component 505 and a context component 515.

The enrollment component 505 may be configured to obtain audio data from a user representing the user's neutral emotional state. The enrollment component 505 may be configured to cause the device 110 to request the user to speak one or more sentences. For example, the enrollment component 505 may cause the device 110 to output "for enrollment purposes, please say I love the weather today," and the user may say "I love the weather today," which may be represented by the audio data 211. The enrollment component 505 may process the audio data 211 representing the reference utterance spoken by a user. In some cases, the audio data 211 may include multiple utterances, and the reference audio data 510 may correspond to the multiple utterances.

The enrollment component 505 may also be configured to determine if the audio data 211 can be used as a baseline for representing a user's neutral emotional state. If the audio data 211 is determined to be a good/valid baseline, then the enrollment component 505 may store the audio data 211 as the reference audio data 510 in the profile storage 270 and associate the reference audio data 510 with the user's profile as a baseline for emotion detection.

The enrollment component 505 may analyze the audio data 211 to determine if the corresponding acoustic speech attributes are within a predefined range or satisfy certain conditions that indicate a neutral emotional state of the user. As used herein, acoustic speech attributes refers to features like accent, pitch, prosody (intonation, tone, stress, rhythm), speech, and the like that can be derived from audio data. The enrollment component 505 may have identified and stored acoustic speech attributes representing a neutral emotional state based on analyzing audio data from multiple users representing a general population or a particular population (to account for accents, cultural differences, and other factors that affect speech based on a geographic location), and may use these acoustic speech attributes to determine if the audio data 211 represents a neutral emotional state of a user.

In some embodiments, the enrollment component 505 may employ ML model to process the audio data 211 to determine an emotion category corresponding to the audio data. If the ML model determines that the emotion category corresponding to the audio data 211 is neutral, then the enrollment component 505 may store the audio data 211 as the reference audio data 510. If the ML model determines the emotion category corresponding to the audio data 211 to be other than neutral (angry, happy, etc.) then the audio data 211 may be discarded and not used as a baseline for emotion detection. The audio data 211 may be inputted into an encoder (not shown) to determine frame feature vector(s) (not shown). The frame feature vector(s) may represent audio frame level features extracted from the audio data 211. One frame feature vector may represent audio frame level features for an audio frame of 20 ms of the audio data 211. The frame feature vector(s) may be derived by spectral analysis of the audio data 211. In an example embodiment, the emotion component 275 may determine audio data 211 includes an entire utterance, and the frame feature vector(s) may be used to determine utterance feature vector(s) representing utterance-level features of one or more utterances represented in the audio data 211. The utterance feature vector(s) may be determined by performing statistical calculations, delta calculation and other processing on the frame feature vector(s) for the audio frames corresponding to an utterance of interest. The ML model (not shown) employed by the enrollment component 505 may process the frame feature vector(s) to determine or more scores indicating an emotion of the user when speaking an utterance represented by frame feature vector(s). In another embodiment, the ML model may process the utterance-level feature vectors to determine one or more scores indicating an emotion of the user when speaking an utterance represented by frame feature vector(s). The ML model may be trained, using a training dataset, to process audio frame features and/or utterance level features to determine an emotion of the user. In some embodiments, the ML model may be trained to output a score indicating a confidence level of how neutral the user's emotion is, for example, a score of 1-2 may indicate a low confidence level, a score of 3 may indicate a medium confidence level, and a score of 4-5 may indicate a high confidence level. In other embodiments, the ML model may be trained to output an indication of low, medium or high for the neutral emotion category. In an example embodiment, the ML model may be a neural network machine learning model (recurrent neural network, deep learning neural network, a convolutional neural network, etc.), a statistical model, a probabilistic model, or another type of model.

The enrollment component 505 may be configured to request the user to repeat a sentence or say another sentence if the audio data 211 does not represent a good baseline for emotion detection. The enrollment component 505 may cause the device 110 to output, for example, "please repeat I love the weather today". The enrollment component 505 may process the audio data received in response from the user to determine if that can be used as a baseline. In some embodiments, the enrollment component 505 may only make a few attempts to obtain audio data for a baseline. After trying two or three times, and not able to obtain data that can be used for a baseline, the enrollment component 505 may cause the device 110 to output audio to inform the user that the system is not going to continue with the enrollment process and that the user should try again at another time. The audio data 211 may not be of good quality because of background noises or the audio data 211 may not represent the user's neutral emotional state (for example, the user may be too excited or angry during the enrollment process).

In some embodiments, the enrollment component 505 may request the user to speak a specific sentence. In other embodiments, the enrollment component 505 may request the user to speak about a topic, rather than saying a specific sentence. In some embodiments, the enrollment component 505 may request the user to say a specific sentence and also talk about a topic to capture audio data for both situations because a user may exhibit different speaking styles/acoustic speech attributes when repeating a sentence versus talking freely about a topic. The enrollment component 505 may process the audio data representing the user saying a specific sentence and the audio data representing the user freely talking about a topic to determine an appropriate baseline, for example, using the differences in the acoustic speech attributes for the two situations, the average (weighted or unweighted) of the acoustic speech attributes for the two situations, statistical analysis, a machine learning model to process the corresponding feature vectors, and/or using other methods.

The emotion detection component 275 may be configured to obtain reference audio data (for multiple baselines) from the user under different circumstances. Doing so enables the system to account for the different speaking styles/acoustic speech attributes exhibited by the user under different circumstances. The context component 515 may be configured to determine data (e.g., context data 520) that represents the user's environment, circumstances, location, setting or other background data corresponding to the user when he or she spoke the audio being used for the baseline. For example, the context component 515 may determine where the user was when speaking the reference utterance by using the device's 110 location or other information associated with the user profile. The context component 515 may determine an interaction type which includes with whom the user was interacting with when speaking the utterance, the setting the user was in when speaking (e.g., work meeting, family/friends gathering, sporting event, concert, etc.), the time (e.g., morning, afternoon, evening, the day of the week, etc.), any action the user is engaged in while speaking (e.g., driving, walking, watching television, etc.) and the like. The context data 520 may also include data representing other contextual information corresponding to when the user spoke the audio, such as weather information, physiological data (e.g., heart rate, blood pressure, body temperature, etc.) associated with the user, the season of the year, the month of the year, and the like. The context component 515 may determine the context data 520 by retrieving data from the user profile storage 270, other data storage and/or other systems/applications. The context component 515 may derive the context data 520 by processing the audio data and determining properties or features from the audio data indicating certain context data. In some embodiments, the system may receive input data from the user indicating the context data such as the user's location (e.g., home, work, gym, etc.), with whom the user is interacting with (e.g., co-workers, boss, spouse/significant other, children, neighbors, etc.), a setting the user in (e.g., work meeting, social gathering, etc.), an action the user is engaged in (e.g., driving, walking, etc.) and the like.

The emotion detection component 275 may store multiple baselines and corresponding context data in the profile storage 270. For example, the emotion detection component 275 may store first audio data (e.g., 510a) representing a first baseline in the profile storage 270 along with context data (e.g., 520a) indicating <location: work>, second audio data (e.g., 510b) representing a second baseline along with context data (e.g., 520b) indicating <location: home>, third audio data (e.g., 510c) representing a third baseline along with context data (e.g., 520c) indicating <person: co-worker>, fourth audio data (e.g., 510d) representing a fourth baseline along with context data (e.g., 520d) indicating <person: daughter>, and so on.

In some embodiments, prior to the enrollment component 505 processing the audio data 211, the emotion detection component 275 may determine that the audio data 211 includes speech from one or more persons other than the user enrolling in emotion detection. For example, as part of the enrollment process the system may receive permission from the user to record his or her speech for a limited period of time to obtain audio representing the user's interactions in various situations and settings, so that the system may determine baselines for different contexts. As described above, this is beneficial because a user may exhibit different speaking styles/acoustic speech attributes in different circumstances based on with whom he or she is interacting, where he or she is speaking, and/or what he or she is doing. As such, the audio data 211 may include speech from person(s) other than the user. In such cases, the emotion detection component 275 may, using the user recognition component 295, recognize one or more users as described in connection with FIGS. 3 and 4. If a portion of the audio data 211 is determined to be from a person other than the user, then that portion of the audio data 211 is discarded, and only the portion of the audio data 211 that corresponds to the user is stored for further processing and to enroll the user for emotion detection.

Figure 6:
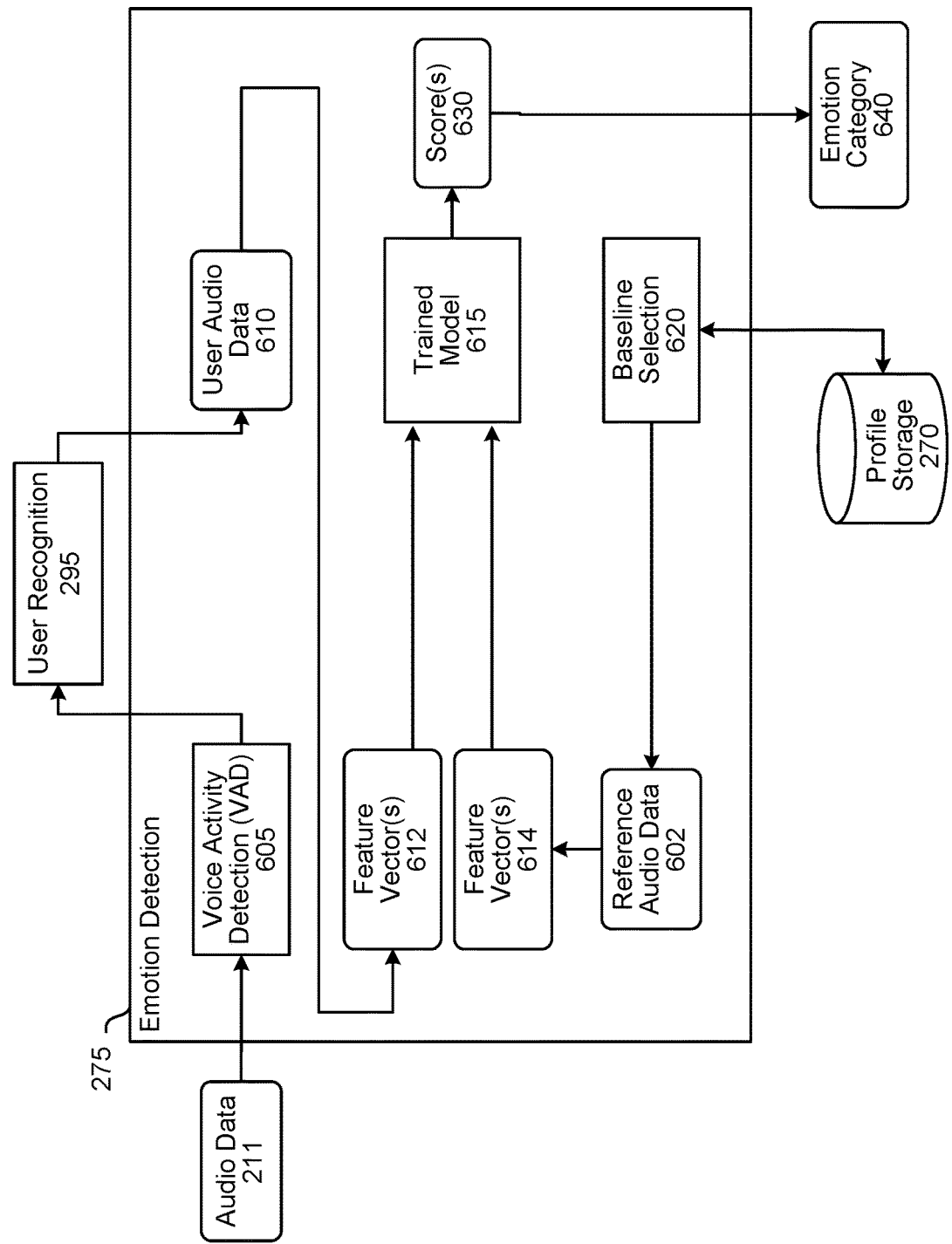
FIG. 6 is a conceptual diagram illustrating an emotion detection component according to embodiments of the present disclosure.

FIG. 6 is a conceptual diagram illustrating an emotion detection component according to embodiments of the present disclosure. In addition to the components illustrated in FIG. 5, the emotion detection component 275 may also include a voice activity detection (VAD) component 605, a trained model 615 and a baseline selection component 620. The audio data 211 captured by a device 110 may be inputted into the VAD component 605. The emotion detection component 275 may reside with a device 110a, with another device proximate to and in communication with device 110 such as device 110b or with a remote device such as with system(s) 120. If the emotion detection component 275 does not reside on the device 110a that is capturing audio, the emotion detection component 275 may not necessarily include the VAD component 605 (or may not necessarily include other components) and may or may not include other components as well. The precise composition of the emotion detection component 275 depends on system configuration.

The VAD component 605 may determine if the audio data 211 includes speech spoken by a human or voice activity by a human, and may determine a portion of the audio data 211 that includes speech or voice activity. The VAD component 605 may send the portion of the audio data 211 including speech or voice activity to the user recognition component 295. The VAD component 605 may employ voice activity detection techniques. Such techniques may determine whether speech is present in audio data based on various quantitative aspects of the audio data, such as the spectral slope between one or more frames of the audio data; the energy levels of the audio data in one or more spectral bands;

the signal-to-noise ratios of the audio data in one or more spectral bands; or other quantitative aspects. In other examples, the VAD component 605 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user recognition component 295 (which may be located on a same or different device as the emotion detection component 275) may communicate with the emotion detection component 275 to determine user audio data 610 that corresponds to a particular user profile. The user recognition component 295 may recognize one or more users as described in connection with FIGS. 3 and 4. For example, the user recognition component 295 may identify stored data corresponding to a voice profile associated with the user profile, and determine a confidence level that a portion of the input audio data corresponds to the voice profile based on analyzing the stored data. The user recognition component 295 may determine if the confidence level meets/satisfies a threshold. If the confidence level for a portion of the input audio data is below a threshold, then the respective portion of input audio is discarded as it does not represent speech from the user associated with the user profile. If the confidence level for a portion of the input audio data meets/satisfies a threshold, then the respective portion of the input audio data is stored as the user audio data 610.

The user audio data 610 may be a portion of the audio data 211 that includes speech or one or more utterances from a particular user associated with the user profile. In other words, audio data representing a particular user's speech may be isolated and stored as the user audio data 610 for further analysis. In an example embodiment, the user may be associated with or using the device 110, and may have provided permission to the system(s) 120 to record and analyze his or her voice/conversations to determine an emotion category corresponding to the conversation.

Prior to performing further analysis on the user audio data 610, the emotion detection component 275 may confirm that the user has granted permissions to analyze speech spoken by the user for emotion detection.

Figure 11:
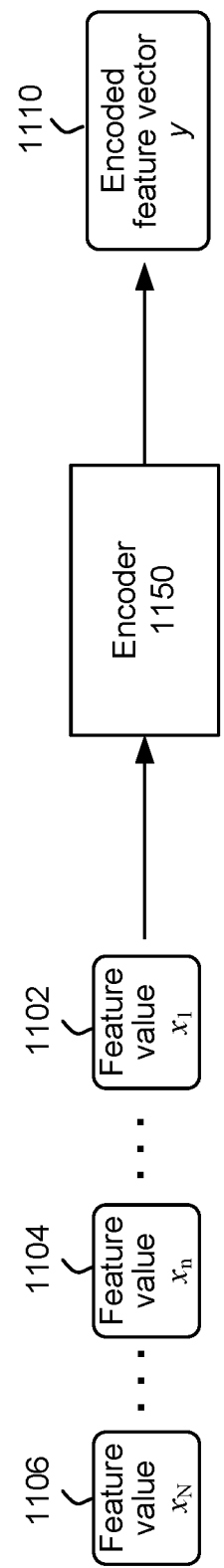
FIG. 11 illustrates operation of an encoder according to embodiments of the present disclosure.

The user audio data 610 may be inputted into an encoder 1150 (described further in relation to FIG. 11 to determine frame feature vector(s) 612. The frame feature vector(s) 612 may represent audio frame level features extracted from the user audio data 610. One frame feature vector 612 may represent features extracted for a window of 25 ms of audio, where the window slides or moves in increments of 10 ms to extract features represented by the next frame feature vector. In other embodiments, one frame feature vector 612 may represent features corresponding to an individual word in the utterance. The emotion detection component 275 may determine the portions of user audio data 610 that correspond to individual words and extracts features from the respective portions of audio using the encoder 1150. The frame feature vector(s) 612 may be derived by spectral analysis of the user audio data 610, and may indicate acoustic speech attributes such as accent, pitch, intonation, tone, stress, rhythm, speed, etc.

The baseline selection component 620 may be configured to identify or select a baseline for emotion detection. In some embodiments, the profile storage 270 may store reference audio data corresponding to multiple baselines associated with different context data. The baseline selection component 620 may determine which baseline to use during runtime to analyze the particular input audio data 211. The baseline selection component 620 may select a baseline from the multiple baselines based on the context data associated with the baseline and the context data associated with the audio data 211. The baseline selection component 620 request the context component 515 to determine context data corresponding to the audio data 211, such as the location of the user (e.g., using the device's 110 location), the person he/she is interacting with, and the like. The baseline selection component 620 may select a baseline with context data that is similar to the context data of the audio data 211 for emotion detection, thus, using an appropriate baseline to account for the user exhibiting different speaking styles/acoustic speech attributes in different situations. In other embodiments, the baseline selection component 620 may analyze (e.g., using a ML model, statistical analysis, or other methods) features corresponding to the reference audio data for the baselines and the audio data 211 to identify a baseline with features similar to the audio data 211. In some embodiments, if the baseline selection component 620 cannot identify a baseline with context data that is similar to the audio data's context data, then the baseline selection component 620 may select the best baseline available based on the quality of the baseline (e.g., audio quality, quality of the acoustic features, the best representation of a neutral emotional state, etc.). In some embodiments, the system may determine an average baseline using the features of all or some of the baselines associated with the user profile.

In some embodiments, where the profile storage 270 only includes one baseline, the baseline selection component 620 may be disabled and may not perform any actions.

The baseline selection component 620 may retrieve the reference audio data 602 corresponding to the baseline to be used for emotion detection. The reference audio data 602 may be inputted into an encoder 1150 (described further in relation to FIG. 11 to determine frame feature vector(s) 614. The frame feature vector(s) 614 may represent audio frame level features extracted from the reference audio data 602. One frame feature vector 614 may represent features extracted for a window of 25 ms of audio, where the window slides or moves in increments of 10 ms to extract features represented by the next frame feature vector. In other embodiments, one frame feature vector 614 may represent features corresponding to an individual word in the utterance. The emotion detection component 275 may determine the portions of reference audio data 602 that correspond to individual words and extract features from the respective portions of audio using the encoder 1150. The frame feature vector(s) 614 may be derived by spectral analysis of the reference audio data 602, and may indicate acoustic speech attributes such as accent, pitch, intonation, tone, stress, rhythm, speed, etc., corresponding to the user's neutral emotional state.

The trained model 615 may process the frame feature vector(s) 612 and the frame feature vector(s) 614. The trained model 615 may be configured to process features of reference audio data 602 and the input audio data 211 to determine an emotion category corresponding to the audio data 211 based on the user's neutral emotional state (represented by the reference audio data 602). The trained model 615 may output one or more score(s) 630 indicating an emotion category 640 corresponding to the audio data 211. The emotion categories may include broad categories such as positive, neutral, and negative. In other embodiments, the emotion categories may be more specific and may include, for example, anger, happiness, sadness and neutral. In another embodiment, the emotion categories may include anger, sad, happy, surprised, stress, and disgust. As can be appreciated, various emotion categories/indicators are possible depending on the system configuration. In some embodiments, the trained model 615 may be configured to determine context data corresponding to the input audio data 211.

In some embodiments, the system may be configured to further process the audio data 211/user audio data 610 using one or more other trained models to detect the user's sentiment derived from which words the user says to express his or hers views/opinions.

Figure 8:
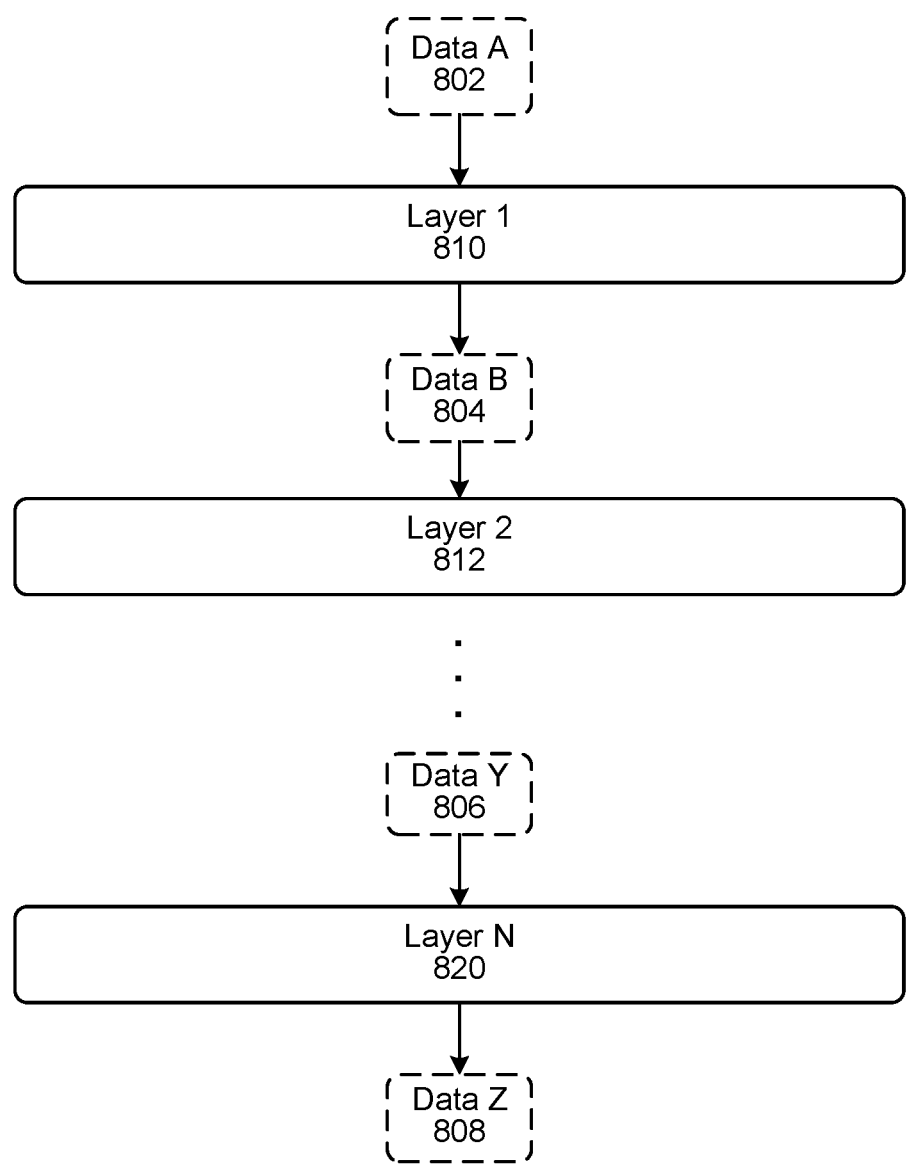
FIG. 8 is a conceptual diagram illustrating layers of a trained model according to embodiments of the present disclosure.

The trained model 615 may be a neural network, for example a deep learning neural network (DNN). As illustrated in FIG. 8, a neural network may include a number of layers, from input layer 1 810 through output layer N 820. Each layer includes one or more nodes and is configured to input a particular type of data and output another type of data. A layer may be represented by a data structure that represents the connections between layers and operations within a layer. The neural network illustrated in FIG. 8 is configured to input data of type data A 802 (which is the input to layer 1 810) and output data of type data Z 808 (which is the output from the last layer N 820). The output from one layer is then taken as the input to the next layer. For example, the output data (data B 804) from layer 1 810 is the input data for layer 2 812 and so forth such that the input to layer N 820 is data Y 806 output from the penultimate layer (not shown).

While values for the input data/output data of a particular layer are not known until a neural network is actually operating during runtime, the data describing the neural network describes the structure and operations of the layers of the neural network.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)) and others. As an example, a neural network typically includes an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 7:
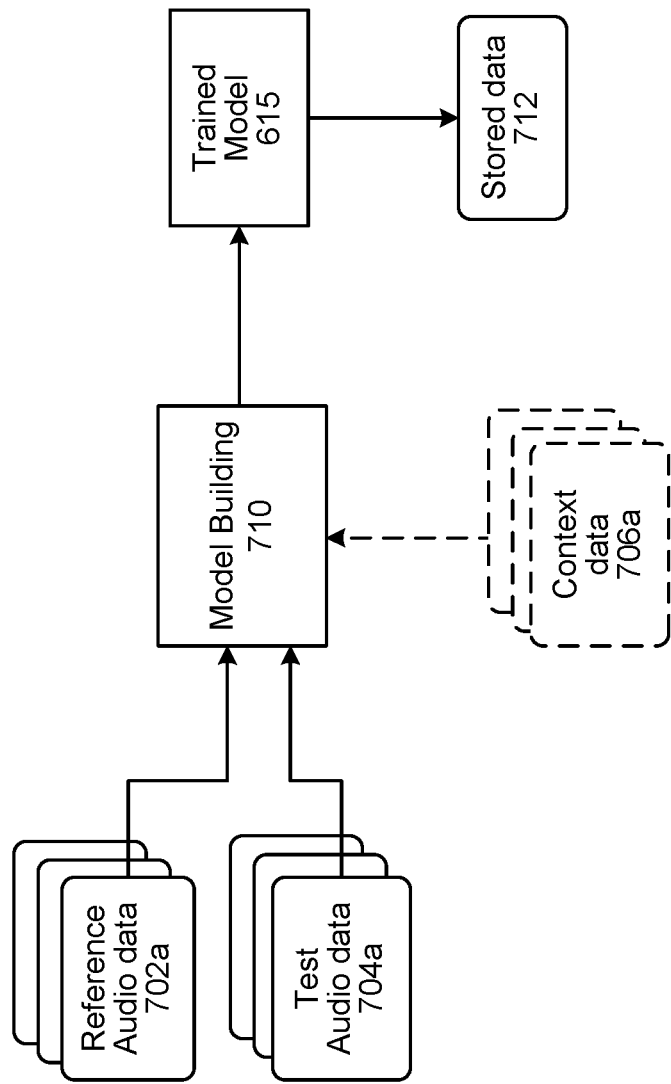
FIG. 7 is a conceptual diagram of building the trained model using training data according to embodiments of the present disclosure.

FIG. 7 conceptually illustrates components for training a ML model for emotion detection using a baseline. The emotion component 275 may include a model building component 710. The model building component 710 may be a separate component included in the system(s) 120.

The model building component 710 may train one or more machine learning models to determine an emotion corresponding to a user input based on the user's neutral emotional state represented by a baseline/reference audio data. The model building component 710 may train the one or more machine learning models during offline operations. The model building component 710 may train the one or more machine learning models using a training dataset.

The training dataset may include a pair of audio data, one representing a neutral emotional state of a speaker and the other representing a non-neutral emotional state of the speaker. For example, the reference audio data 702a may represent a first speaker's neutral emotional state, and the test audio data 704a may represent the first speaker's non-neutral (e.g., angry) emotional state. The reference audio data 702b may represent a second speaker's neutral emotional state and the test audio data 704b may represent the second speaker's non-neutral (e.g., happy) emotional state. The pair of audio data 702 and 704 may make up the training dataset used by the model building component 710 to train a ML model to detect emotion using a baseline. The test audio data 704 may be annotated or labeled with the emotion category corresponding by the test audio data.

In some embodiments, the training dataset may also include context data 706 corresponding to the reference audio data 702 and/or the test audio data 704. The context data 706a, for example, may represent the first speaker's environment, circumstances, location, setting or other background information corresponding to the first speaker when he or she spoke the reference audio data 702a and/or the test audio data 704a. The context data 706a may also represent an interaction type which includes with whom the first speaker was interacting with when speaking the utterance, the setting the first speaker was in when speaking (e.g., work meeting, family/friends gathering, sporting event, concert, etc.), the time (e.g., morning, afternoon, evening, the day of the week, etc.), any action the first speaker was engaged in while speaking (e.g., driving, walking, watching television, etc.) and the like. The context data 520 may also include data representing other contextual information corresponding to when the first speaker spoke the audio, such as weather information, physiological data associated with the user, the season of the year, the month of the year, and the like. The context data 706a may represent the context corresponding to the reference audio data 702a and the test audio data 704a, where they both have similar/same contexts. In other embodiments, the context data 706a may represent the context corresponding to the reference audio data 702a only, and the training dataset may optionally include additional context data (not shown) corresponding to the test audio data 704a. Thus, the trained model 615 may be configured using context data 706 to determine/identify context data corresponding to input audio data during runtime operations.

As part of the training process, the model building component 710 may determine weights and parameters various layers of the trained model 615. The weights and parameters corresponding to the final state of the trained model 615 may be stored as stored data 712.

Figure 9:
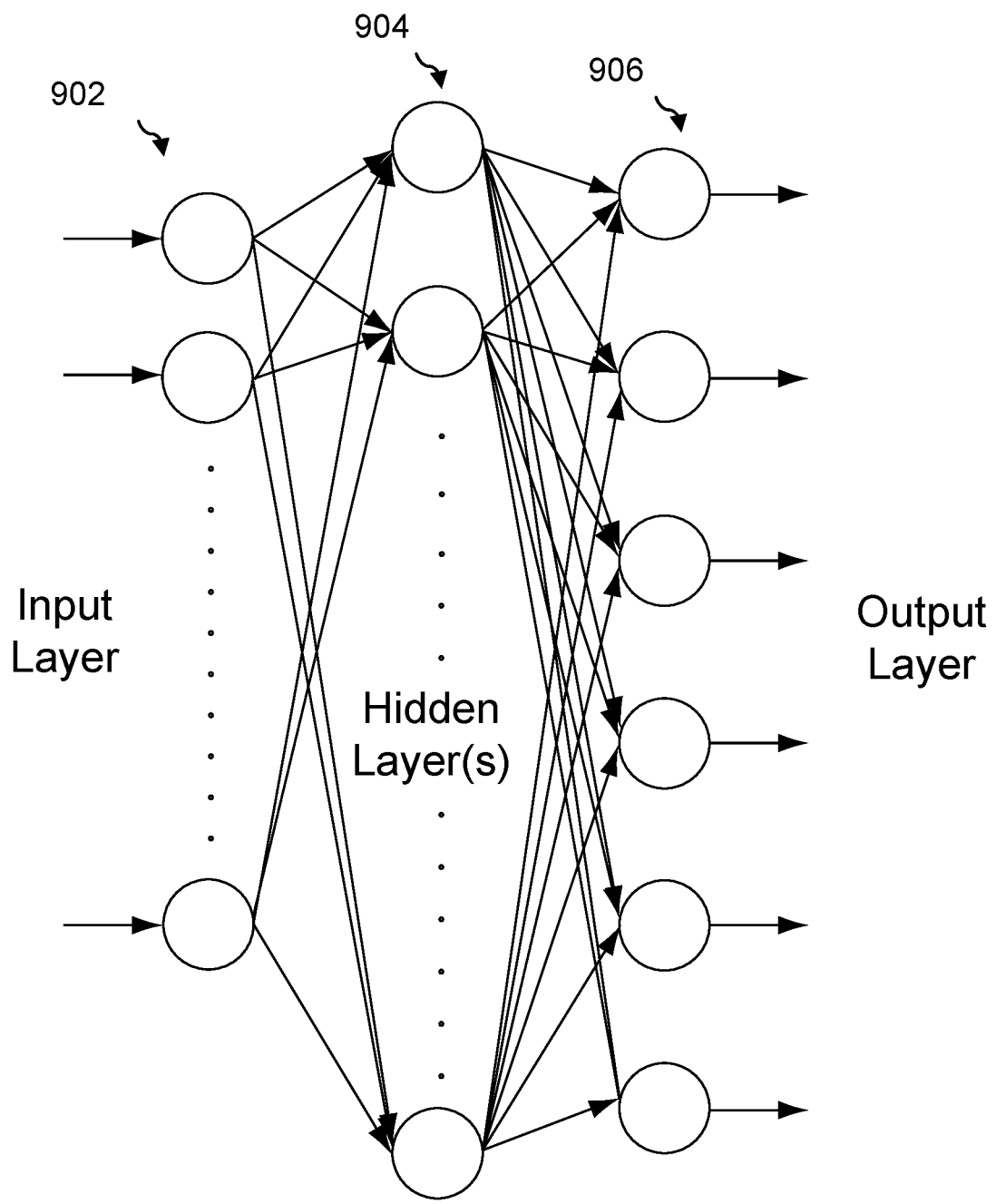
FIG. 9 illustrates a neural network such as one that may be used for emotion detection according to embodiments of the present disclosure.

An example neural network for the trained model 615 is illustrated in FIG. 9. A neural network may be structured with an input layer 902, middle layer(s) 904, and an output layer 906. The middle layer(s) may also be known as the hidden layer(s). Each node of the hidden layer is connected to each node in the input layer and each node in the output layer. Although illustrated in FIG. 9 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 10:
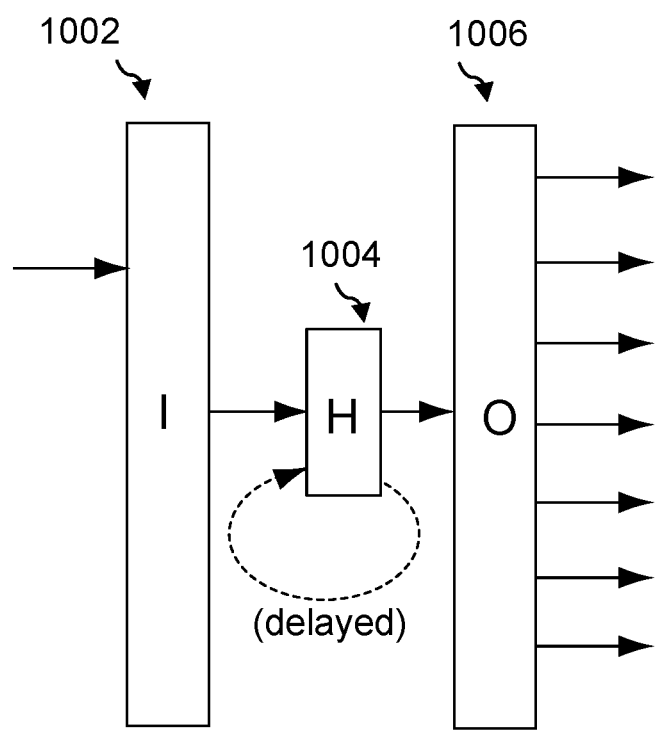
FIG. 10 illustrates a neural network such as one that may be used for emotion detection according to embodiments of the present disclosure.

In one aspect, the neural network may be constructed with recurrent connections such that the output of the hidden layer of the network feeds back into the hidden layer again for the next set of inputs. Such a neural network is illustrated in FIG. 10. Each node of the input layer 1002 connects to each node of the hidden layer 1004. Each node of the hidden layer 1004 connects to each node of the output layer 1006. As illustrated, the output of the hidden layer 1004 is fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 10, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

FIG. 11 illustrates feature data values 1102-1106 being processed by an encoder 1150 to generate an encoded feature vector y. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on user of the encoded vector and other system configurations. Any particular encoder 1150 will be configured to output vectors of the same size, thus ensuring a continuity of output encoded vector size from any particular encoder 1150 (though different encoders may output vectors of different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder may be implemented as a recurrent neural network (RNN), for example as a long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

- linear, one direction (forward or backward),
- bi-linear, essentially the concatenation of a forward and a backward embedding, or
- tree, based on parse-tree of the sequence.

In addition, an attention model can be used, which is another RNN or DNN that learns to "attract" attention to certain parts of the input. The attention model can be used in combination with the above methods of consuming the input.

FIG. 11 illustrates operation of the encoder 1150. The input feature value sequence, starting with feature value $x_1$ 1102, continuing through feature value $x_n$ 1104 and concluding with feature value $x_N$ 1106 is input into the encoder 1150. The encoder 1150 may process the input feature values as noted above. The encoder 1150 outputs the encoded feature vector y 1110, which is a fixed length feature vector of length F. One or more encoders such as 1150 may be used with the emotion detection component 275. For example, the audio data 211/user audio data 610 may be processed using an encoder 1150a to determine the feature vector(s) 612, and the reference audio data 602 may be processed using an encoder 1150b to determine the feature vector(s) 614. In some embodiments, the encoders 1150a and 1150b may both be an LSTM but have may have different weights and parameters configured to encode input audio data and reference audio data respectively. In other embodiments, the encoders 1150a and 1150b may have the same weights and parameters. In yet another embodiment, the encoder 1150a (for processing the input audio data) and the encoder 1150b (for processing the reference audio data) may share its weights and parameters for particular layers. For example, the emotion detection component 275 may employ a shared or stacked LSTM to process the input audio data and the reference audio data. One or more layers (e.g., layer 1 810, layer 812) of the encoder 1150b may share its weights and parameters with one or more layers of the encoder 1150a, and vice-versa.

Figure 12:
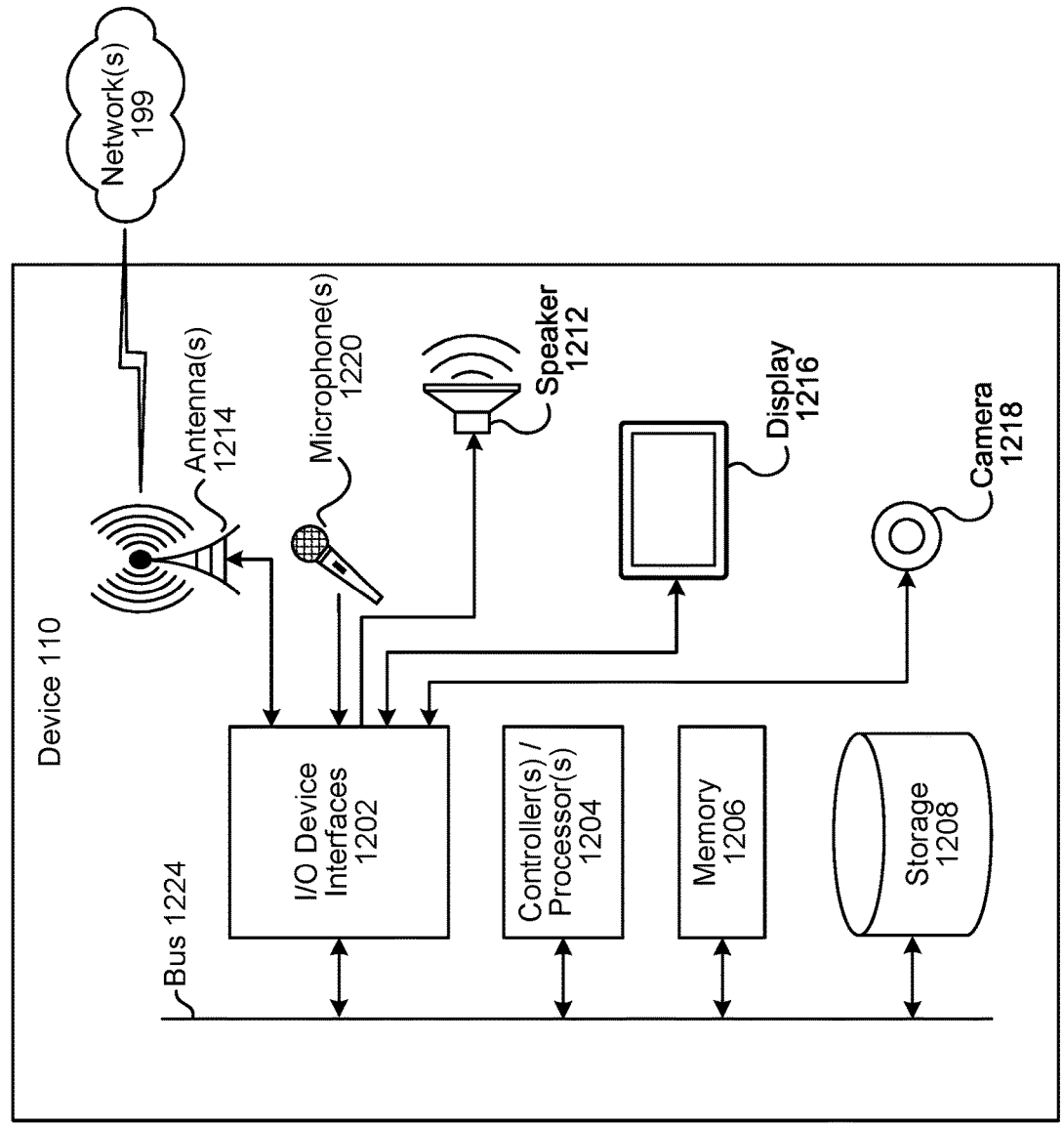
FIG. 12 is a block diagram conceptually illustrating example components of a device according to embodiments of the present disclosure.
Figure 13:
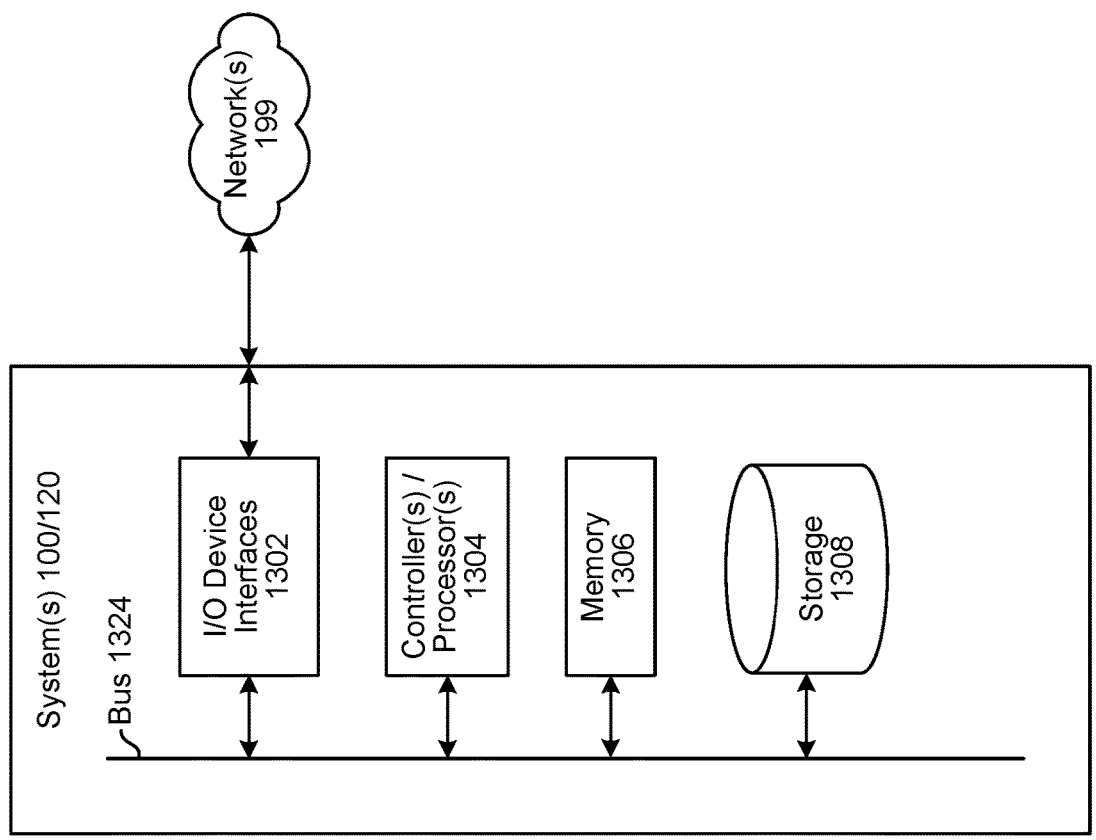
FIG. 13 is a block diagram conceptually illustrating example components of a server according to embodiments of the present disclosure.

FIG. 12 is a block diagram conceptually illustrating a device 110a and a device 110b that may be used with the system. FIG. 13 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (100/120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (100/110/120/225) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (100/110/120/225) may also include a data storage component (1208/1308) for storing data and controller/processor-executable instructions. Each data storage component (1208/1308) may individually include one or more non-volatile storage types such as magnetic storage, optical storage, solid-state storage, etc. Each device (100/110/120/225) may also be connected to removable or external non-volatile memory and/or storage (such as a removable memory card, memory key drive, networked storage, etc.) through respective input/output device interfaces (1202/1302).

Computer instructions for operating each device (100/110/120/225) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (100/110/120/225) includes input/output device interfaces (1202/1302). A variety of components may be connected through the input/output device interfaces (1202/1302), as will be discussed further below. Additionally, each device (100/110/120/225) may include an address/data bus (1224/1324) for conveying data among components of the respective device. Each component within a device (100/110/120/225) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones 1220, a wired headset or a wireless headset (not illustrated), etc. If an array of microphones 1220 is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the I/O device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1202/1302) may also include communication components that allow data to be exchanged between devices such as different physical servers in a collection of servers or other components.

The components of the device(s) 110, the system(s) 100, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1202/1302), processor(s) (1204/1304), memory (1206/1306), and/or storage (1208/1308) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 100, the system(s) 120, and the skill system(s) 225, as described herein, are illustrative, and may be located as a stand-alone device or may be included, in whole or in part, as a component of a larger device or system.

Figure 14:
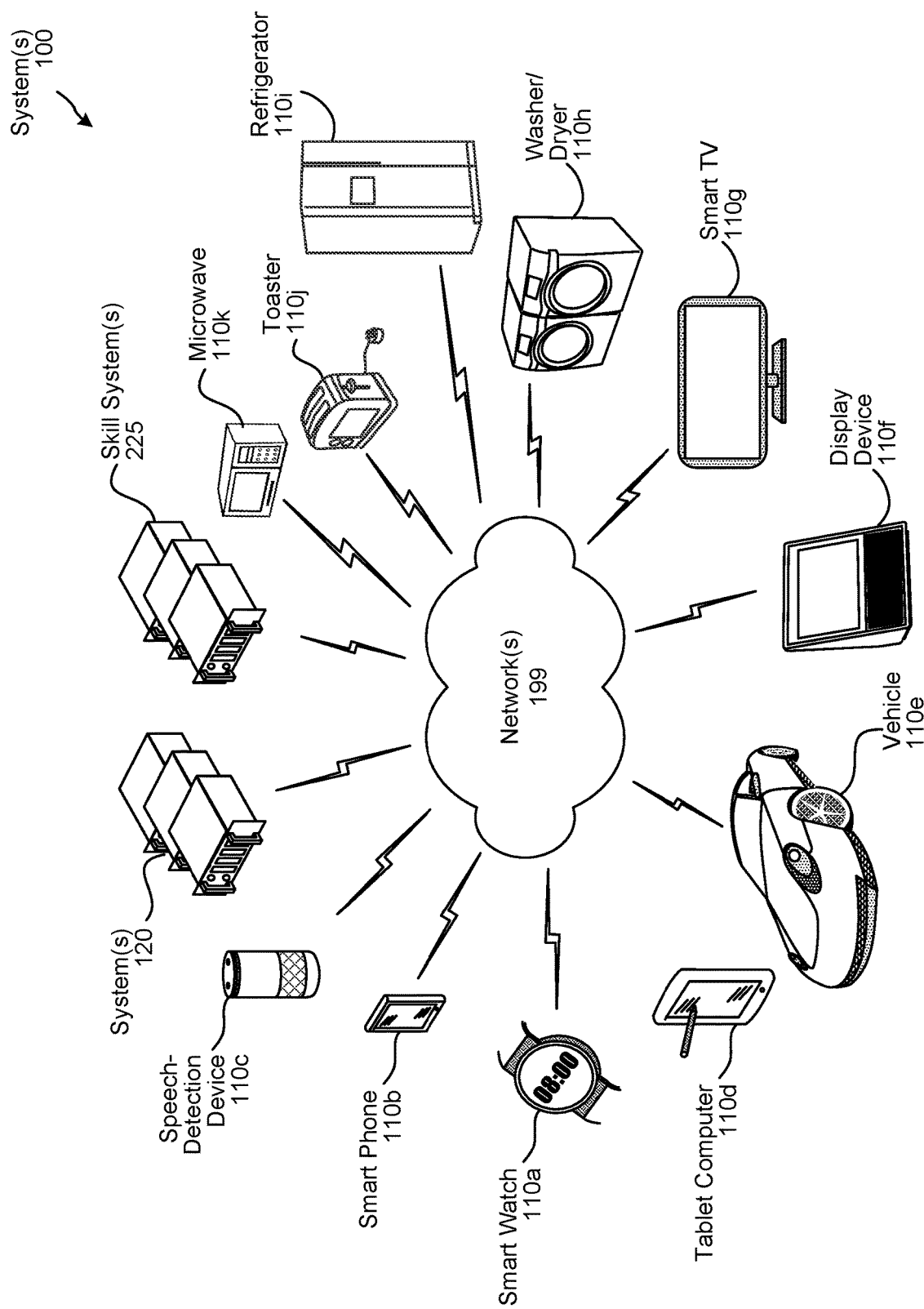
FIG. 14 illustrates an example of a computer network for use with the speech processing system.

As illustrated in FIG. 14, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a smart watch 110a, a smart phone 110b, a speech-detection device 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
   receiving input audio data;
   determining that the input audio data represents audio from a user associated with a user profile;
   receiving first context data corresponding to the input audio data;

selecting first reference audio data associated with the user profile, wherein the first reference audio data is selected based on the first context data corresponding to second context data associated with the first reference audio data;

determining first feature data representing acoustic attributes corresponding to the first reference audio data;

determining second feature data representing acoustic attributes corresponding to the input audio data; and processing the first feature data and the second feature data using a trained model to determine output data representing at least one difference between the input audio data and the first reference audio data.

2. The computer-implemented method of claim 1, further comprising:

determining the user profile is associated with the first reference audio data and second reference audio data, wherein the selecting comprises selecting the first reference audio data instead of the second reference audio data.

3. The computer-implemented method of claim 1, wherein the first context data indicates the user is participating in a first activity.

4. The computer-implemented method of claim 1, wherein the first context data indicates the user is interacting with another user.

5. The computer-implemented method of claim 1, wherein the first reference audio data corresponds to baseline speech spoken by the user.

6. The computer-implemented method of claim 1, wherein the first reference audio data corresponds to a neutral state of the user.

7. The computer-implemented method of claim 1, wherein the output data further represents a first state of the user corresponding to the audio relative to a second state of the user corresponding to the first reference audio data.

8. The computer-implemented method of claim 1, wherein determining the first feature data comprises:

processing the first reference audio data using a first encoder to determine the first feature data, the first encoder having at least a first processing layer and a second processing layer.

9. The computer-implemented method of claim 8, wherein determining the second feature data comprises:

processing the input audio data using a second encoder and data corresponding to the second processing layer to determine the second feature data.

10. A system comprising:
at least one processor; and
at least one memory comprising instructions that, when executed by the at least one processor, cause the system to:
receive input audio data;
determine that the input audio data represents audio from a user associated with a user profile;
receive first context data corresponding to the input audio data;
select first reference audio data associated with the user profile, wherein the first reference audio data is selected based on the first context data corresponding to second context data associated with the first reference audio data;
determine first feature data representing acoustic attributes corresponding to the first reference audio data;
determine second feature data representing acoustic attributes corresponding to the input audio data; and
process the first feature data and the second feature data using a trained model to determine output data representing at least one difference between the input audio data and the first reference audio data.

11. The system of claim 10, wherein the at least one memory further comprises instructions that, when executed by the at least one processor, further cause the system to:
determine the user profile is associated with the first reference audio data and second reference audio data, wherein the instructions that cause the system to select the first reference audio data comprise instructions that, when executed by the at least one processor, cause the system to select the first reference audio data instead of the second reference audio data.

12. The system of claim 10, wherein the first context data indicates the user is participating in a first activity.

13. The system of claim 10, wherein the first context data indicates the user is interacting with another user.

14. The system of claim 10, wherein the first reference audio data corresponds to baseline speech spoken by the user.

15. The system of claim 10, wherein the first reference audio data corresponds to a neutral state of the user.

16. The system of claim 10, wherein the output data further represents a first state of the user corresponding to the audio relative to a second state of the user corresponding to the first reference audio data.

17. The system of claim 10, wherein the instructions that cause the system to determine the first feature data comprise instructions that, when executed by the at least one processor, cause the system to:
process the first reference audio data using a first encoder to determine the first feature data, the first encoder having at least a first processing layer and a second processing layer.

18. The system of claim 17, wherein the instructions that cause the system to determine the second feature data comprise instructions that, when executed by the at least one processor, cause the system to:
process the input audio data using a second encoder and data corresponding to the second processing layer to determine the second feature data.

* * * * *